United States Patent
Connor

(10) Patent No.: US 9,791,862 B1
(45) Date of Patent: Oct. 17, 2017

(54) SYSTEMS AND METHOD FOR UNMANNED UNDERSEA SENSOR POSITION, ORIENTATION, AND DEPTH KEEPING

(71) Applicant: THAYERMAHAN, INC., Mystic, CT (US)

(72) Inventor: Michael Joseph Connor, Mystic, CT (US)

(73) Assignee: THAYERMAHAN, INC., Mystic, CT (US)

( * ) Notice: Subject to any disclaimer, the term of this patent is extended or adjusted under 35 U.S.C. 154(b) by 0 days.

(21) Appl. No.: 15/387,554

(22) Filed: Dec. 21, 2016

Related U.S. Application Data

(60) Provisional application No. 62/326,942, filed on Apr. 25, 2016.

(51) Int. Cl.
  *G05D 1/02* (2006.01)
  *G05D 1/04* (2006.01)
  *G05D 1/08* (2006.01)
  *G05D 1/00* (2006.01)
  *B63B 35/00* (2006.01)
  (Continued)

(52) U.S. Cl.
  CPC .......... *G05D 1/0206* (2013.01); *B63B 21/62* (2013.01); *B63B 21/66* (2013.01); *B63B 35/00* (2013.01); *G05D 1/0055* (2013.01); *G05D 1/048* (2013.01); *G05D 1/0875* (2013.01);
  (Continued)

(58) Field of Classification Search
  CPC ...... G08C 23/02; G01C 21/20; G01V 1/3808; G01V 1/3826; G01V 3/083; F16L 1/24; G01H 9/00; B63B 21/66; H01M 4/90; D07B 5/00; G06F 21/33; B63C 11/42; B64C 39/024; B63G 2008/002;
  (Continued)

(56) References Cited

U.S. PATENT DOCUMENTS 3,987,745 A * 10/1976 Chaverebiere de Sal .......... B63B 21/66
367/106
4,486,861 A 12/1984 Harmel
(Continued)

FOREIGN PATENT DOCUMENTS

WO   WO-9950619 A1   10/1999
WO   WO-2008116205 A1   9/2008
(Continued)

OTHER PUBLICATIONS

U.S. Appl. No. 15/388,212 Office Action dated Apr. 21, 2017.
Co-pending U.S. Appl. No. 15/388,212, filed Dec. 22, 2016.
U.S. Appl. No. 15/388,212 Office Action dated Jan. 30, 2017.

*Primary Examiner* — Daniel Pihulic
(74) *Attorney, Agent, or Firm* — Wilson Sonsini Goodrich & Rosati

(57) ABSTRACT

The methods and devices described herein provide a sensor array positioning system that may allow a user to program a series of sensor array locations, depths and orientations into a control center, which therein commands two or more unmanned surface or submarine vehicles which positions one or more sensor arrays. The devices consist of at least two unmanned vehicles, two or more tow cables, a flexible sensor array comprising one or more sensors, and one or more buoyancy engines. The unmanned vehicles may consist of a master vehicle and one or more slave vehicles, wherein the master vehicle commands the one or more slave vehicles.

24 Claims, 6 Drawing Sheets

(51) Int. Cl.
*B63B 21/62* (2006.01)
*B63B 21/66* (2006.01)
*G01V 1/20* (2006.01)
*G01V 1/38* (2006.01)

(52) U.S. Cl.
CPC ........ *B63B 2035/008* (2013.01); *G01V 1/201* (2013.01); *G01V 1/3843* (2013.01); *G01V 2001/207* (2013.01)

(58) Field of Classification Search
CPC ........ B63G 2008/004; B63G 2008/005; B63G 2008/007; B63G 8/42
See application file for complete search history.

(56) References Cited

U.S. PATENT DOCUMENTS

| | | | |
|---|---|---|---|
| 4,912,682 A | 3/1990 | Norton, Jr. et al. | |
| 6,140,958 A | 10/2000 | Johnson et al. | |
| 6,208,584 B1 | 3/2001 | Skinner | |
| 6,590,831 B1 | 7/2003 | Bennett et al. | |
| 6,913,854 B1 | 7/2005 | Alberte et al. | |
| 7,359,604 B2 | 4/2008 | Po | |
| 7,371,136 B2 | 5/2008 | Hine et al. | |
| 7,386,210 B2 | 6/2008 | Farroni et al. | |
| 7,775,174 B1 | 8/2010 | Humphreys et al. | |
| 8,611,002 B2 | 12/2013 | Frith | |
| 8,668,534 B2 | 3/2014 | Hine et al. | |
| 8,764,498 B2 | 7/2014 | Hine | |
| 8,808,041 B2 | 8/2014 | Hine et al. | |
| 9,151,267 B2 | 10/2015 | Hine et al. | |
| 9,352,996 B2 | 5/2016 | Guertin et al. | |
| 2003/0208320 A1 | 11/2003 | Zajac | |
| 2009/0020063 A1 | 1/2009 | Ruffa | |
| 2009/0224099 A1 | 9/2009 | Steele et al. | |
| 2011/0055557 A1 | 3/2011 | Nakamura | |
| 2012/0042855 A1 | 2/2012 | Vogely et al. | |
| 2012/0134671 A1 | 5/2012 | Edwards et al. | |
| 2012/0186507 A1 | 7/2012 | Nock | |
| 2012/0227504 A1 | 9/2012 | Goldner et al. | |
| 2013/0247536 A1 | 9/2013 | Erlendsson et al. | |
| 2013/0266380 A1 | 10/2013 | Capron et al. | |
| 2014/0153363 A1* | 6/2014 | Juhasz | G01V 3/083 367/24 |
| 2014/0284998 A1 | 9/2014 | Brennan et al. | |
| 2014/0355380 A1* | 12/2014 | Barral | G01V 1/3817 367/16 |
| 2015/0323692 A1* | 11/2015 | Reynolds | G01V 1/201 367/17 |
| 2015/0346365 A1 | 12/2015 | Desrues | |
| 2016/0023739 A1 | 1/2016 | Brennan et al. | |
| 2016/0139245 A1 | 5/2016 | Forero et al. | |

FOREIGN PATENT DOCUMENTS

| | | |
|---|---|---|
| WO | WO-2012126009 A2 | 9/2012 |
| WO | WO-2013003640 A1 | 1/2013 |
| WO | WO-2014145601 A2 | 9/2014 |

* cited by examiner

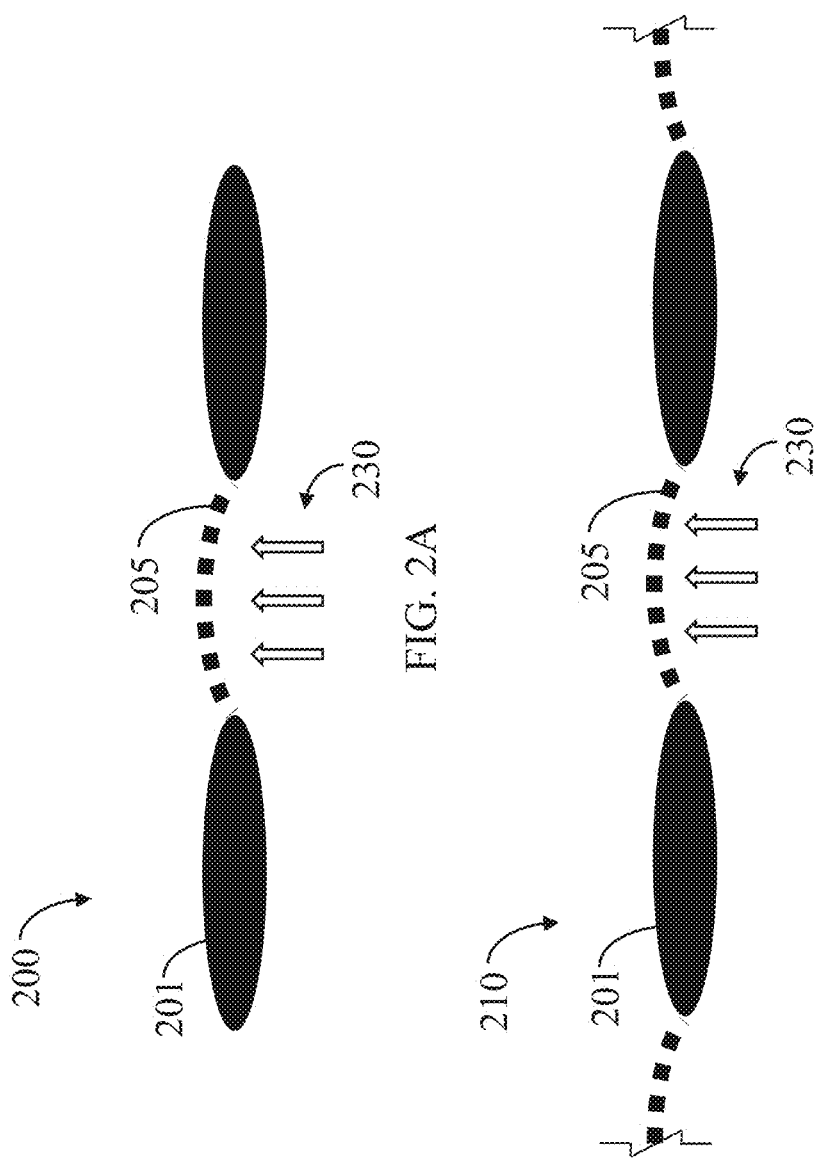

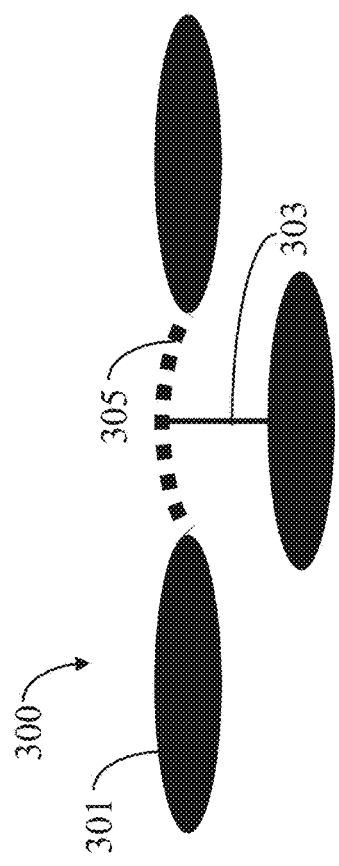
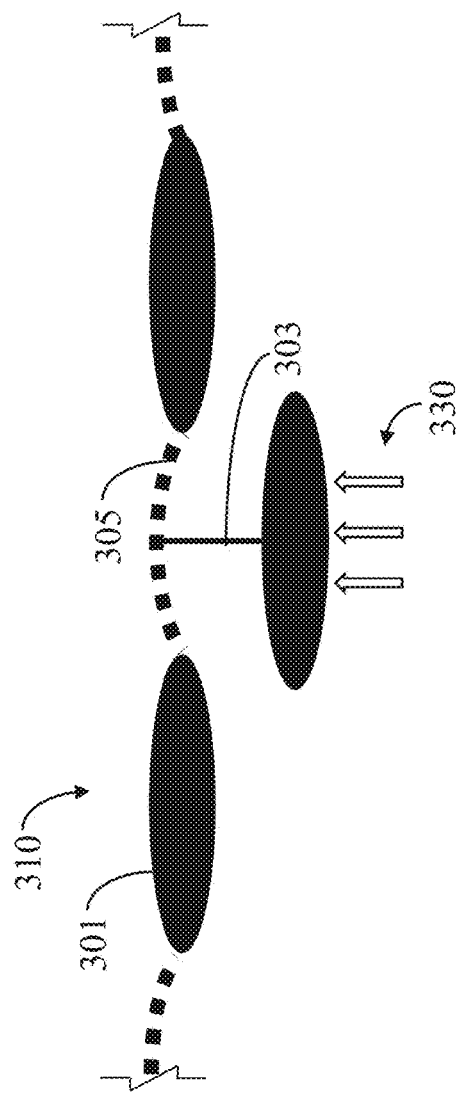

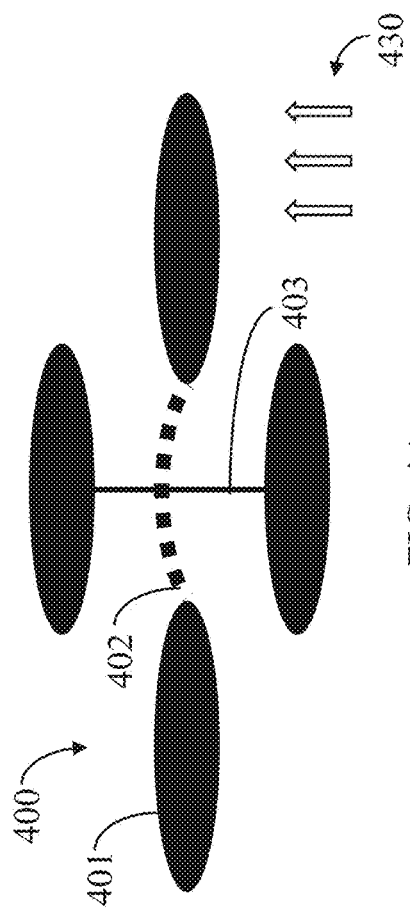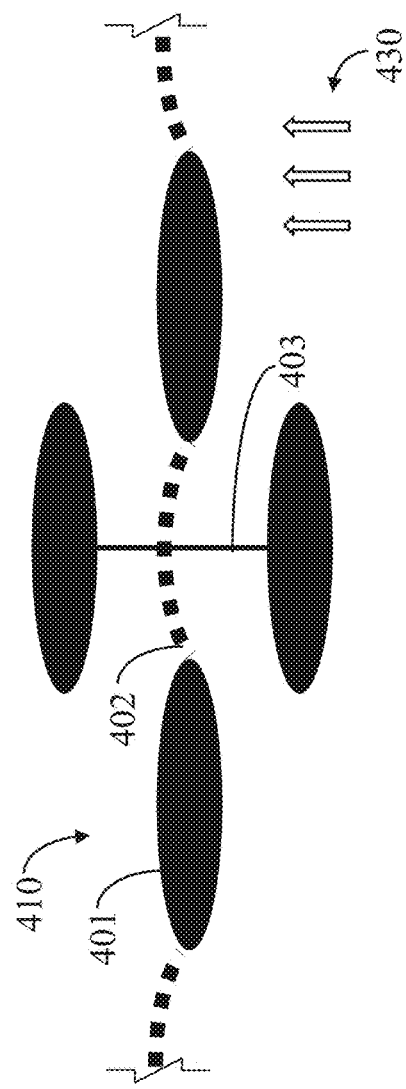
FIG. 4A
FIG. 4B

SYSTEMS AND METHOD FOR UNMANNED UNDERSEA SENSOR POSITION, ORIENTATION, AND DEPTH KEEPING

CROSS-REFERENCE

This application claims the benefit of U.S. Provisional Application Ser. No. 62/326,942, filed Apr. 25, 2016, which is incorporated herein by reference.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BACKGROUND OF THE INVENTION

The information disclosed and claimed below relates generally to the field of ocean monitoring with acoustic, electromagnetic, pressure, or optical sensors. More specifically, it provides a sensor array positioning system that can function without a pilot for long periods of time at sea.

SUMMARY OF THE INVENTION

Provided herein are methods, devices and systems for positioning one or more subsea sensor arrays. An aspect of the invention provides a system, the system comprising: a sensor array, two or more unmanned watercrafts, a tow cable and a control station which directs the watercrafts.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications may be made within the scope of the invention without departing from the spirit thereof.

In one aspect disclosed herein is a sensor array positioning system comprising a sensor array having first end and a second end, two or more unmanned watercrafts, a tow cable having a proximal end and a distal end, and a control station which directs the watercrafts.

In some embodiments, the control station is a computer system comprising a processor, a memory, and an operating system. In further embodiments, the computer system is a cloud computer system.

In some embodiments, the watercrafts comprise a master watercraft and one or more slave watercrafts. In further embodiments, the control system communicates with a master watercraft, which commands one or more slave watercrafts.

In some embodiments, the watercrafts comprise a ship, boat, an aerial drone, a hovercraft, a submarine, or any combination thereof. In some embodiments, the number of watercrafts is at least about 2. In further embodiments, the number of watercrafts is at most about 10,000. In further embodiments, the quantity of watercrafts is about 2 to about 10,000. In further embodiments, the number of watercrafts is about 2 to about 5.

In some embodiments, at least one watercraft contains a digital signal processor. In further embodiments, the digital signal processor comprises a microprocessor, a microcontroller, a central processing unit, or any combination thereof. In yet further embodiments, the digital signal processor comprises a system for tampering prevention. In further embodiments, the system for tampering prevention comprises encryption, cryptography, or any combination thereof.

In some embodiments, the length of the tow cable is at least about 50 feet. In further embodiments, the length of the tow cable is at most about 100 feet. In further embodiments, the length of the tow cable is about 50 feet to about 1,000 feet. In further embodiments, the length of the tow cable is about 125 feet.

In some embodiments, the diameter of the tow cable is at least about 0.5 millimeters. In further embodiments, the diameter of the tow cable is at most about 9 millimeters. In further embodiments, the diameter of the tow cable is about 0.5 millimeters to about 9 millimeters. In further embodiments, the diameter of the tow cable is about 1 millimeter to about 2 millimeters.

In some embodiments, the sensor array comprises an acoustic sensor, and/or a non-acoustic sensor. In further embodiments, the non-acoustic sensor comprises a depth sensor, and an electromagnetic sensor. In some embodiments a depth sensor is a bathymeter, an echosounder, an ultrasound meter, an ultrasound meter, or a laser distance meter.

In some embodiments, the length of the sensor array is at least about 6 feet. In some embodiments, the length of the sensor array is at most about 600 feet. In further embodiments, the length of the sensor array is about 6 feet to about 600 feet. In further embodiments, the length of the sensor array is about 125 feet.

In some embodiments, the quantity of sensors per foot of the length of the sensor is at least about 0.01. In further embodiments, the quantity of sensors per foot of the length of the sensor is at most about 8. In further embodiments, the quantity of sensors per foot of the length of the sensor is about 0.01 to about 8. In further embodiments, the quantity of sensors per foot of the length of the sensor is about 4. In yet further embodiments, the sensors are equally spaced along the length of the sensor array.

In some embodiments, two or more watercrafts are connected by a sensor array, a primary tow cable and a secondary tow cable. In further embodiments, a sensor array is connected to two watercrafts. In further embodiments, the proximal and distal ends of the primary tow cables are attached to a first watercraft and to the first end of the sensor array, respectively, and the distal and proximal ends of the secondary tow cable are attached to the second end of the sensor array and to a subsequent watercraft, respectively. In further embodiments, a sensor array is connected to three or more tow cables and, each tow cable attaches to a watercraft. In further embodiments, each watercraft connects to more than two tow cables, and each tow cable each attaches to a sensor array.

In some embodiments, the watercrafts connected by the sensor array and tow cables form an open chain. In further embodiments, the watercrafts connected by the sensor array and tow cables form a closed loop. In further embodiments, the watercrafts connected by the sensor array and tow cables form a reticulum.

Some embodiments further comprise a buoyancy engine. In further embodiments, the buoyancy engine is attached to the sensor array. In further embodiments, the buoyancy engine is attached to the tow cable. In further embodiments, the buoyancy engine is attached to the sensor array and the tow cable. In further embodiments, the quantity of buoyancy engines is at least about 2. In further embodiments, the quantity of buoyancy engines is at most about 300. In further embodiments, the quantity of buoyancy engines is about 2 to about 300. Some embodiments further comprise a tow cable direction sensor mounted to a watercraft.

In some embodiments, the system has an uninterrupted operation period of least about 2 days. In some embodiments, the system has an uninterrupted operation period of most about 300 days. In further embodiments, the system has an uninterrupted operation period of about 2 days to about 300 days.

In some embodiments, the sensor array may be positioned at a depth of at least about 1 foot while stationary. In further embodiments, the sensor array may be positioned at a depth of at most about 1,000 feet while stationary. In further embodiments, the sensor array may be positioned at a depth of about 1 foot to about 1,000 feet while stationary. In further embodiments, the sensor array may be positioned at a depth of about 250 feet while stationary. In further embodiments, the sensor array may be positioned at a depth of at least about 1 foot while in transit. In further embodiments, the sensor array may be positioned at a depth of at most about 1,000 feet while in transit. In further embodiments, the sensor array may be positioned at a depth of about 1 foot to about 1,000 feet while in transit. In further embodiments, the sensor array may be positioned at a depth of about 250 feet while in transit.

A second aspect disclosed herein is a method of localizing a submerged sensor array comprising a user programming a target parameter into a control station, the control station calculating a sensor array positioning system operational instruction, the control station sending an operational instruction to the sensor array positioning system, the sensor array positioning system receiving an operational instruction, the sensor array positioning system storing an operational instruction, the sensor positioning system measuring its current position, arrangement and array depth, the sensor positioning system modifying its position and arrangement without a pilot, and the sensor positioning system modifying its sensor array depth.

In some embodiments, a target parameter comprises a sensor position, a sensor velocity, a sensor heading, a sensor depth, a separation distance between two adjacent watercrafts, initiating sensor measurement, and ceasing sensor measurement.

In some embodiments, the operational instructions comprise a watercraft position, a watercraft velocity, a watercraft heading, and a buoyancy engine buoyancy.

In some embodiments, a series of one or more target parameters may be programmed automatically by selecting a mode. In further embodiments, the target parameters programmed by selecting a mode are time independent. In further embodiments, the target parameters programmed by selecting a mode are time dependent. In yet further embodiments, the modes comprise patterns of target parameters for transit, obstacle avoidance, debris disentanglement, surveillance, and search. In further embodiments, the sensor transit mode comprises setting a sensor velocity to a maximum value, setting a sensor depth to a minimum value, setting a separation distance to a maximum value, ceasing sensor measurement, or any combination thereof. In further embodiments, the obstacle avoidance mode comprises setting a sensor depth to a maximum value, setting a separation distance to a minimum value, ceasing sensor measurement, or any combination thereof. In further embodiments, the debris disentanglement mode comprises setting a sensor velocity to a minimum value, setting a sensor depth to a maximum value, setting a separation distance to a minimum value, setting a sensor depth to a minimum value, setting a separation distance to a maximum value, setting a sensor heading to one or more set values, ceasing sensor measurement, or any combination thereof. In further embodiments, the surveillance mode comprises setting a sensor position to a set value, setting a sensor velocity to a set value, setting a sensor depth to a set value, setting a sensor heading to a set value, initiating sensor measurement, or any combination thereof. In further embodiments, the search mode comprises setting a sensor position to a set value, setting a sensor velocity to a set value, setting a sensor depth to a set value, setting a sensor heading to a set value, initiating sensor measurement, or any combination thereof.

Some embodiments further comprise setting a time period value associated with each set target parameter value.

In some embodiments, a master watercraft is commanded by a control station, and the master watercraft directs a slave watercraft. In some embodiments, one or more of the processes of the sensor array positioning system receiving an operational instruction, are performed by a master watercraft. In some embodiments, one or more of the processes of the sensor array positioning system storing an operational instruction are performed by a master watercraft. In some embodiments, the step of the sensor positioning system measuring its current position, arrangement and array depth comprises measuring the location of a watercraft, measuring the heading of a watercraft, reading a depth sensor measurement, or any combination thereof.

In some embodiments, the location is measured by a GPS receiver. In some embodiments, the heading is measured by a compass.

Some embodiments further comprise reading a tow cable direction sensor measurement.

Some embodiments further comprise the underwater measurement system communicating the current position and arrangement to the control station. In some embodiments, communicating the current position and arrangement to the control station is performed by the master watercraft.

In some embodiments, the step of the sensor positioning system modifying its position and arrangement without a pilot comprises modifying the position of one or more watercrafts, modifying the velocity of one or more watercrafts, modifying the heading of one or more watercrafts, modifying the buoyancy of one or more buoyancy engines, or any combination thereof. In further embodiments, the step of the sensor positioning system modifying its position and arrangement without a pilot is coordinated by a master watercraft. In further embodiments, the sensor positioning system does not modify its position and arrangement if the location measurement reading is within a set accuracy of the respective watercraft's stored target position. In further embodiments, the set accuracy is at most about 0.01 nautical miles. In further embodiments, the set accuracy is at most about 10 nautical miles. In further embodiments, the set accuracy is about 0.01 nautical miles to about 10 nautical miles.

In further embodiments the sensor positioning system overrides a stored target positions with a respective stored location measurement if the location measurement value is within a set accuracy of the respective watercraft's stored target position. In further embodiments, the set accuracy is no less than about 0.01 nautical miles. Some embodiments comprise not implementing the step of the sensor positioning system modifying its sensor array depth if the array depth measurement reading in step is within a set accuracy of the respective target array depth. In further embodiments, the set accuracy is no less than about 10 feet. In further embodiments, the set accuracy is no more than about 100 feet. In some embodiments, the set accuracy is about 10 feet to about 100 feet.

Some embodiments comprise the sensor positioning system overriding a stored target depth with a respective stored depth measurement if the depth measurement value is within a set accuracy of the respective watercraft's stored target depth. In further embodiments, the set accuracy is no less than about 10 feet. In further embodiments, the set accuracy is no more than about 100 feet. In further embodiments, the set accuracy is about 10 feet to about 100 feet.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 2A-2B show an exemplary schematic top view diagram of the first preferred mode of a sensor array positioning system;

FIGS. 3A-3B show an exemplary schematic top view diagram of the second preferred mode of a sensor array positioning system;

FIGS. 4A-4B show an exemplary schematic top view diagram of the third preferred mode of a sensor array positioning system;

DETAILED DESCRIPTION OF THE INVENTION

Figure 1:
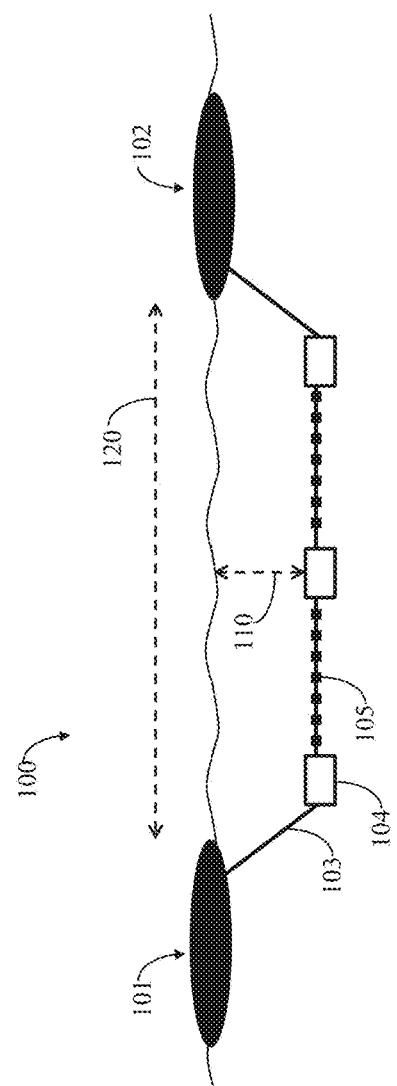
FIG. 1 shows an exemplary side view schematic diagram of a sensor array positioning system.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The world's oceans are a source of food and raw materials, and serve as an efficient path for trade and transportation, and as such, form an arena of competition between nations, corporations and citizens. Additionally, as subsea facilities offer a means to conceal military and criminal activity, there may be a distinct need for detecting illegal and illicit subsurface activity on the high seas, in seaport areas and along coasts.

Subsea detection has been traditionally performed by acoustic or electromagnetic sensors that are either fixed to the seafloor, or are deployed and recalled by ships, submarines or airplanes. Some such sensors may be interconnected to form a monitoring network. Deployable sensors may be costly, due to the necessity for a vehicle, fuel, crew, and maintenance. Although fixed sensors may be less expensive, they also may be more vulnerable to discovery and destruction by adversaries. As such, there is a need for an unmanned sensor array positioning system capable of detecting subsea activity with reduced cost and risk of destruction.

Such subsea sensors must be large enough to exploit long acoustic and electromagnetic waves and be placed at to proper depth and heading to detect certain underwater sources.

Some current subsea detection systems may comprise a linear sensor array comprising two or more hydrophones, and their associated electronics, housed within a flexible tube. The capability of such sensor systems may be dependent on maintaining the linearity of the flexible sensor array, to achieve the required spacing between the hydrophones necessary for optimal detection.

Some current subsea detection systems may maintain array linearity and optimal hydrophone spacing through the tension created by the drag force imposed on the sensor array as it is pulled through the water. The sound of water flowing over a sensor array in motion, however, may create noise that may potentially mask the sound or pattern of sounds generated by a target source.

Some current subsea detection systems may maintain a set sensor depth through the addition of weights and/or floats. As such, the depth of the array may be a function of the tow speed and the length of the tow cable. Some current subsea detection systems may maintain the orientation of the array by adjusting the course of the tow vessel.

Although some of the current systems may be cheap to manufacture, their designs create performance and detection area limitations dictated by the current inherent relationship between tow speed, tow depth and array linearity. Additionally, the requisite for a large tow vessel, and its respective crew and associated maintenance costs, may generally prohibit expensive continuous long-term sensing operations.

Some unmanned vehicles may lack the power and endurance to pull a large sensor array through the water with sufficient speed over a sufficient period of time, to achieve the tension required to maintain the shape, depth and orientation of the array.

Therefore, there is a need for a system of unmanned vehicles capable of supporting a large linear sensor array at the requisite depth and compass orientation which contains the power required to pull the array at speed through the water. The ability to establish the proper shape, depth and orientation of the array with minimal movement through the water has the additional benefit of reducing the amount of undesired flow induced noise at the location of the sensors.

Sensor Array

In some embodiments, a sensor array comprises one or more sensors. In some embodiments, a sensor refers to a device capable of detecting and/or recording data emitted from one or more sources. In some embodiments, a sensor comprises an acoustic sensor and/or a non-acoustic sensor. In some embodiments, an acoustic sensor comprises a condenser microphone, a dynamic microphone, a ribbon microphone, a USB microphone, a stereo microphone, a crystal microphone or any combination thereof. In some embodiments, an acoustic sensor comprises a hydrophone. In some embodiments, a hydrophone comprises a microphone designed for recording or listening to underwater sound. Some hydrophones may comprise a piezoelectric transducer that generates electricity when subjected to a pressure change created by a propagating sound wave.

In some embodiments, a non-acoustic sensor comprises a depth sensor and/or an electromagnetic sensor. In some embodiments, a depth sensor comprises a water depth measuring device including but not limited to: a pressure sensor, a bathymeter, an echosounder, an ultrasound meter, an ultrasound meter, a laser distance meter, or any combination thereof. In some embodiments, a sensor array comprises one or more hydrophones, and their associated electronics, housed within a flexible tube.

In some embodiments, a sensor array is shaped as an open chain, a closed loop, a reticulum or any combination thereof. In some embodiments, an open chain refers to a linear structure that may or may not contain branches. In some embodiments, a closed loop refers to a series with a single cyclical structure that may or may not contain branches. In some embodiments, a reticulum refers to a series with more than one cyclical structure that may or may not contain branches.

In some embodiments, the quantity of sensors per foot of the sensor array is least about 0.01. In some embodiments, the quantity of sensors per foot of the sensor array is at most about 8. In some embodiments, the quantity of sensors per foot of the sensor array is about 0.01 to about 8. In further embodiments, the quantity of sensors per foot of the sensor array is about 0.01, 0.05, 0.1, 0.5, 1, 2, 3, 4, 5, 6, 7, or 8, including increments therein. In various embodiments, the quantity of sensors per foot of the sensor array is about 0.01 to about 0.05, about 0.01 to about 0.1, about 0.01 to about 0.5, about 0.01 to about 1, about 0.01 to about 2, about 0.01 to about 3, about 0.01 to about 4, about 0.01 to about 5, about 0.01 to about 6, about 0.01 to about 7, about 0.01 to about 8, about 0.05 to about 0.1, about 0.05 to about 0.5, about 0.05 to about 1, about 0.05 to about 2, about 0.05 to about 3, about 0.05 to about 4, about 0.05 to about 5, about 0.05 to about 6, about 0.05 to about 7, about 0.05 to about 8, about 0.1 to about 0.5, about 0.1 to about 1, about 0.1 to about 2, about 0.1 to about 3, about 0.1 to about 4, about 0.1 to about 5, about 0.1 to about 6, about 0.1 to about 7, about 0.1 to about 8, about 0.5 to about 1, about 0.5 to about 2, about 0.5 to about 3, about 0.5 to about 4, about 0.5 to about 5, about 0.5 to about 6, about 0.5 to about 7, about 0.5 to about 8, about 1 to about 2, about 1 to about 3, about 1 to about 4, about 1 to about 5, about 1 to about 6, about 1 to about 7, about 1 to about 8, about 2 to about 3, about 2 to about 4, about 2 to about 5, about 2 to about 6, about 2 to about 7, about 2 to about 8, about 3 to about 4, about 3 to about 5, about 3 to about 6, about 3 to about 7, about 3 to about 8, about 4 to about 5, about 4 to about 6, about 4 to about 7, about 4 to about 8, about 5 to about 6, about 5 to about 7, about 5 to about 8, about 6 to about 7, about 6 to about 8, or about 7 to about 8.

Unmanned Watercrafts

In some embodiments, an unmanned watercraft is either a surface vehicle or a submarine vehicle. In some embodiments, an unmanned watercraft comprises a ship, boat, an aerial drone, a hovercraft, a submarine, or any combination thereof. In some embodiments, an unmanned watercraft is either a master watercraft or a slave watercraft. In some embodiments, the number of watercrafts is at least about 2. In some embodiments, the number of watercrafts is at most about 10,000. In some embodiments, the number of watercrafts is about 2 to about 10,000. In further embodiments, the number of watercrafts is about 2, 3, 4, 5, 10, 25, 50, 100, 500, 1,000, 5,000, or 10,000, including increments therein. In various embodiments, the number of watercrafts is about 2 to about 3, about 2 to about 4, about 2 to about 5, about 2 to about 10, about 2 to about 25, about 2 to about 50, about 2 to about 100, about 2 to about 500, about 2 to about 1,000, about 2 to about 5,000, about 2 to about 10,000, about 3 to about 4, about 3 to about 5, about 3 to about 10, about 3 to about 25, about 3 to about 50, about 3 to about 100, about 3 to about 500, about 3 to about 1,000, about 3 to about 5,000, about 3 to about 10,000, about 4 to about 5, about 4 to about 10, about 4 to about 25, about 4 to about 50, about 4 to about 100, about 4 to about 500, about 4 to about 1,000, about 4 to about 5,000, about 4 to about 10,000, about 5 to about 10, about 5 to about 25, about 5 to about 50, about 5 to about 100, about 5 to about 500, about 5 to about 1,000, about 5 to about 5,000, about 5 to about 10,000, about 10 to about 25, about 10 to about 50, about 10 to about 100, about 10 to about 500, about 10 to about 1,000, about 10 to about 5,000, about 10 to about 10,000, about 25 to about 50, about 25 to about 100, about 25 to about 500, about 25 to about 1,000, about 25 to about 5,000, about 25 to about 10,000, about 50 to about 100, about 50 to about 500, about 50 to about 1,000, about 50 to about 5,000, about 50 to about 10,000, about 100 to about 500, about 100 to about 1,000, about 100 to about 5,000, about 100 to about 10,000, about 500 to about 1,000, about 500 to about 5,000, about 500 to about 10,000, about 1,000 to about 5,000, about 1,000 to about 10,000, or about 5,000 to about 10,000.

In some embodiments, the control station contains a system for tampering prevention, wherein the system for tampering prevention comprises encryption, cryptography, or any combination thereof.

In some embodiments, the unmanned watercraft consists of a Liquid Robotics Wave Glider®.

Tow Cable

In some embodiments, the tow cable is comprised of a fiber optic core, a metallic coating, a carbon coating and an insulation layer.

In some embodiments, the thickness of the tow cable is at least about 0.6 millimeters. In some embodiments, the thickness of the tow cable is at most about 1.2 millimeters. In some embodiments, the thickness of the tow cable is about 0.6 millimeters to about 1.2 millimeters. In further embodiments, the thickness of the tow cable is about 0.6 millimeters, 0.7 millimeters, 0.8 millimeters, 0.9 millimeters, 1 millimeter, 1.1 millimeters, 1.2 millimeters, 1.3 millimeters, 1.4 millimeters, 1.5 millimeters, 2 millimeters, or 2.5 millimeters, including increments therein. In various embodiments, the thickness of the tow cable is about 0.6 millimeters to about 0.7 millimeters, about 0.6 millimeters to about 0.8 millimeters, about 0.6 millimeters to about 0.9 millimeters, about 0.6 millimeters to about 1 millimeter, about 0.6 millimeters to about 1.1 millimeters, about 0.6 millimeters to about 1.2 millimeters, about 0.6 millimeters to about 1.3 millimeters, about 0.6 millimeters to about 1.4 millimeters, about 0.6 millimeters to about 1.5 millimeters, about 0.6 millimeters to about 2 millimeters, about 0.6 millimeters to about 2.5 millimeters, about 0.7 millimeters to about 0.8 millimeters, about 0.7 millimeters to about 0.9 millimeters, about 0.7 millimeters to about 1 millimeter, about 0.7 millimeters to about 1.1 millimeters, about 0.7 millimeters to about 1.2 millimeters, about 0.7 millimeters to about 1.3 millimeters, about 0.7 millimeters to about 1.4 millimeters, about 0.7 millimeters to about 1.5 millimeters, about 0.7 millimeters to about 2 millimeters, about 0.7 millimeters to about 2.5 millimeters, about 0.8 millimeters to about 0.9 millimeters, about 0.8 millimeters to about 1 millimeter, about 0.8 millimeters to about 1.1 millimeters, about 0.8 millimeters to about 1.2 millimeters, about 0.8 millimeters to about 1.3 millimeters, about 0.8 millimeters to about 1.4 millimeters, about 0.8 millimeters to about 1.5 millimeters, about 0.8 millimeters to about 2 millimeters, about 0.8 millimeters to about 2.5 millimeters, about 0.9 millimeters to about 1 millimeter, about 0.9 millimeters to about 1.1 millimeters, about 0.9 millimeters to about 1.2 millimeters, about 0.9 millimeters to about 1.3 millimeters, about 0.9 millimeters to about 1.4 millimeters, about 0.9 millimeters to about 1.5 millimeters, about 0.9 millimeters to about 2 millimeters, about 0.9 millimeters to about 2.5 millimeters, about 1 millimeter to about 1.1 millimeters, about 1 millimeter to about 1.2 millimeters, about 1 millimeter to about 1.3 millimeters, about 1 millimeter to about 1.4 millimeters, about 1 millimeter to about 1.5 millimeters, about 1 millimeter to about 2 millimeters, about 1 millimeter to about 2.5 millimeters, about 1.1 millimeters to about 1.2 millimeters, about 1.1 millimeters to about 1.3 millimeters, about 1.1 millimeters to about 1.4 millimeters, about 1.1 millimeters to about 1.5 millimeters, about 1.1 millimeters to about 2 millimeters, about 1.1 millimeters to about 2.5 millimeters, about 1.2 millimeters to about 1.3 millimeters, about 1.2 millimeters to about 1.4 millimeters, about 1.2 millimeters to about 1.5 millimeters, about 1.2 millimeters to about 2 millimeters, about 1.2 millimeters to about 2.5 millimeters, about 1.3 millimeters to about 1.4 millimeters, about 1.3 millimeters to about 1.5 millimeters, about 1.3 millimeters to about 2 millimeters, about 1.3 millimeters to about 2.5 millimeters, about 1.4 millimeters to about 1.5 millimeters, about 1.4 millimeters to about 2 millimeters, about 1.4 millimeters to about 2.5 millimeters, about 1.5 to about 2 millimeters, about 1.5 to about 2.5 millimeters, or about 2 to about 2.5 millimeters.

In some embodiments, the tow cable has a length of at least about 50 feet. In some embodiments, the tow cable has a length of at most about 1,000 feet. In some embodiments, the tow cable has a length of about 50 feet to about 1,000 feet. In further embodiments, the tow cable has a length of about 50 feet, 100 feet, 200 feet, 300 feet, 400 feet, 500 feet, 600 feet, 700 feet, 800 feet, 900 feet, or 1,000 feet, including increments therein. In various embodiments, the tow cable has a length of about 50 feet to about 100 feet, about 50 feet to about 200 feet, about 50 feet to about 300 feet, about 50 feet to about 400 feet, about 50 feet to about 500 feet, about 50 feet to about 300 feet, about 50 feet to about 700 feet, about 50 feet to about 800 feet, about 50 feet to about 900 feet, about 50 feet to about 1,000 feet, about 100 feet to about 200 feet, about 100 feet to about 300 feet, about 100 feet to about 400 feet, about 100 feet to about 500 feet, about 100 feet to about 300 feet, about 100 feet to about 700 feet, about 100 feet to about 800 feet, about 100 feet to about 900 feet, about 100 feet to about 1,000 feet, about 200 feet to about 300 feet, about 200 feet to about 400 feet, about 200 feet to about 500 feet, about 200 feet to about 300 feet, about 200 feet to about 700 feet, about 200 feet to about 800 feet, about 200 feet to about 900 feet, about 200 feet to about 1,000 feet, about 300 feet to about 400 feet, about 300 feet to about 500 feet, about 300 feet to about 300 feet, about 300 feet to about 700 feet, about 300 feet to about 800 feet, about 300 feet to about 900 feet, about 300 feet to about 1,000 feet, about 400 feet to about 500 feet, about 400 feet to about 300 feet, about 400 feet to about 700 feet, about 400 feet to about 800 feet, about 400 feet to about 900 feet, about 400 feet to about 1,000 feet, about 500 feet to about 300 feet, about 500 feet to about 700 feet, about 500 feet to about 800 feet, about 500 feet to about 900 feet, about 500 feet to about 1,000 feet, about 300 feet to about 700 feet, about 300 feet to about 800 feet, about 300 feet to about 900 feet, about 300 feet to about 1,000 feet, about 700 feet to about 800 feet, about 700 feet to about 900 feet, about 700 feet to about 1,000 feet, about 800 feet to about 900 feet, about 800 feet to about 1,000 feet, or about 900 to about 1,000 feet.

In some embodiments, an optical fiber is a flexible, transparent fiber made by drawing glass (silica) or plastic to a small uniform diameter. Optical fibers are used most often as a means to transmit light between the two ends of the fiber and are widely used in fiber-optic communications, because they may permit transmission over longer distances and at higher rates than traditional wire cables. In some embodiments, the optical fiber is capable of transmitting data at a speed of at least about 100 MHz. In some embodiments, the optical fiber is capable of transmitting data at a speed of at most about 500,000 MHz. In some embodiments, the optical fiber is capable of transmitting data at a speed of about 100 MHz to about 500,000 MHz. In further embodiments, the optical fiber is capable of transmitting data at a speed of about 100 MHz, 500 MHz, 1,000 MHz, 5,000 MHz, 10,000 MHz, 50,000 MHz, 100,000 MHz or 500,000 MHz, including increments therein. In various embodiments, the optical fiber is capable of transmitting data at a speed of about 1,000 MHz to about 5,000 MHz, about 1,000 MHz to about 10,000 MHz, about 1,000 MHz to about 50,000 MHz, about 1,000 MHz to about 100,000 MHz, about 1,000 MHz to about 500,000 MHz, about 5,000 MHz to about 10,000 MHz, about 5,000 MHz to about 50,000 MHz, about 5,000 MHz to about 100,000 MHz, about 5,000 MHz to about 500,000 MHz, about 10,000 MHz to about 50,000 MHz, about 10,000 MHz to about 100,000 MHz, about 10,000 MHz to about 500,000 MHz, about 50,000 MHz to about 100,000 MHz, about 50,000 MHz to about 500,000 MHz, or about 100,000 MHz to about 500,000 MHz.

In some embodiments, a carbon coating increases the durability of optical fibers. In some embodiments, the carbon hermetically seals the optical fiber's surfaces and impedes crack growth caused by moisture ingression. In some embodiments, a carbon coating increases the fatigue factor of an optical fiber cable, a measure of the fatigue resistance, by about five times. As such, in some embodiments, a carbon coated fiber optic cable may operate for an increased period of time or at a higher stress level for the same lifetime than a non-carbon coated fiber. In some embodiments, the thickness of the carbon coating is about a few hundred Angstroms. In some embodiments, the thickness of the carbon coating is about 100 Angstroms to about 400 Angstroms. In further embodiments, the thickness of the carbon coating is about 100 Angstroms, about 150 Angstroms, about 200 Angstroms, about 250 Angstroms, about 300 Angstroms, about 350 Angstroms, or about 400 Angstroms, including increments therein. In various embodiments, the thickness of the carbon coating is about 100 Angstroms to about 150 Angstroms, about 100 Angstroms to about 200 Angstroms, about 100 Angstroms to about 250 Angstroms, about 100 Angstroms to about 300 Angstroms, about 100 Angstroms to about 350 Angstroms, about 100 Angstroms to about 400 Angstroms, about 150 Angstroms to about 200 Angstroms, about 150 Angstroms to about 250 Angstroms, about 150 Angstroms to about 300 Angstroms, about 150 Angstroms to about 350 Angstroms, about 150 Angstroms to about 400 Angstroms, about 200 Angstroms to about 250 Angstroms, about 200 Angstroms to about 300 Angstroms, about 200 Angstroms to about 350 Angstroms, about 200 Angstroms to about 400 Angstroms, about 250 Angstroms to about 300 Angstroms, about 250 Angstroms to about 350 Angstroms, about 250 Angstroms to about 400 Angstroms, about 300 Angstroms to about 350 Angstroms, about 300 Angstroms to about 400 Angstroms, or about 350 Angstroms to about 400 Angstroms.

In some embodiments, the insulation layer is comprised of polyimide, Kapton, Teflon, plastic, epoxy, glue, cement, mucilage, paste, plastic, wood, carbon fiber, fiberglass, glass, metal or any combination thereof. In some embodiments, the insulation layer is comprised of bulk fiber polyimide.

In some embodiments, fiber optics that are capable of transmitting multiple propagation paths or transverse modes are called multi-mode fibers (MMF). In some embodiments, fiber optics that are capable of transmitting a single propagation path are called single-mode fibers (SMF). In some embodiments, the fiber optic core comprises a multi-mode fiber. In some embodiments, the fiber optic core comprises a single-mode fiber. In some embodiments, the fiber optic core has a diameter of about 50 microns to about 200 microns. In further embodiments, the fiber optic core has a diameter of about 50 microns, 75 microns, 100 microns, 125 microns, 150 microns, or 200 microns, including increments therein. In various embodiments, the fiber optic core has a diameter of about 50 microns to about 75 microns, about 50 microns to about 100 microns, about 50 microns to about 125 microns, about 50 microns to about 150 microns, about 50 microns to about 200 microns, about 75 microns to about 100 microns, about 75 microns to about 125 microns, about 75 microns to about 150 microns, about 75 microns to about 200 microns, about 100 microns to about 125 microns, about 100 microns to about 150 microns, about 100 microns to about 200 microns, about 125 microns to about 150 microns, about 125 microns to about 200 microns, or about 150 microns to about 200 microns.

In some embodiments, the metal conductor completely surrounds the optic fiber. In some embodiments, the metal conductor provides support for the tow cable. In some embodiments, the metal conductor transmits power.

In some embodiments, the tow cable is produced by Nufern.

Control Station

In some embodiments, a control station comprises a processor, a memory and an operating system.

In some embodiments, the control center includes a processor. A suitable processor includes, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles. Those of skill in the art will recognize that many smartphones are suitable for use in the system described herein. Suitable tablet computers include those with booklet, slate, and convertible configurations, known to those of skill in the art.

In some embodiments, the control center includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the control station includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the control station comprises a cloud computer system. Those of skill in the art will recognize that suitable cloud computer systems include, by way of non-limiting examples, Wi-Fi, radio frequency, wires, or other mechanism communicate to a server that can store data in the cloud, or a hard drive, or in a data historian. Humans may play some role in the form of gathering, analyzing, or manipulating this data In some embodiments, the control station contains a system for tampering prevention, wherein the system for tampering prevention comprises encryption, cryptography, or any combination thereof.

Those of skill will recognize that the various illustrative logical blocks, modules, circuits, and algorithm steps described in connection with the embodiments disclosed herein, including with reference to the control systems described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a Raspberry PI further comprising Arduinos, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC.

Buoyancy Engine

As used herein, and unless otherwise specified, a buoyancy engine refers to a device capable of changing its buoyancy by increasing and decreasing its displaced volume. In some embodiments, the number of buoyancy engines is about 2 to about 300. In further embodiments, the number of buoyancy engines is about 2, about 5, about 10, about 20, about 50, about 100, about 150, about 200, about 250, or about 300, including increments therein. In various embodiments, the number of buoyancy engines is about, about 2 to about 5, about 2 to about 10, about 2 to about 20, about 2 to about 50, about 2 to about 100, about 2 to about 150, about 2 to about 200, about 2 to about 250, about 2 to about 300, about 5 to about 10, about 5 to about 20, about 5 to about 50, about 5 to about 100, about 5 to about 150, about 5 to about 200, about 5 to about 250, about 5 to about 300, about 10 to about 20, about 10 to about 50, about 10 to about 100, about 10 to about 150, about 10 to about 200, about 10 to about 250, about 10 to about 300, about 20 to about 50, about 20 to about 100, about 20 to about 150, about 20 to about 200, about 20 to about 250, about 20 to about 300, about 50 to about 100, about 50 to about 150, about 50 to about 200, about 50 to about 250, about 50 to about 300, about 100 to about 150, about 100 to about 200, about 100 to about 250, about 100 to about 300, about 150 to about 200, about 150 to about 250, about 150 to about 300, about 200 to about 250, about 200 to about 300, or about 250 to about 300.

Operational Capabilities

As used herein, and unless otherwise specified, the term "operation period" refers to the uninterrupted period of time a system may continuously without the need for replenishment or repair.

In some embodiments, the device described herein provides an operation period of about 2 days to about 300 days. In further embodiments, the device described herein provides an operation period of about 2 days, 5 days, 10 days, 20 days, 50 days, 100 days, 150 days, 200 days, 250 days, or 300 days, including increments therein. In various embodiments, the device described herein provides an operation period of about 2 days to about 5 days, about 2 days to about 10 days, about 2 days to about 20 days, about 2 days to about 50 days, about 2 days to about 100 days, about 2 days to about 150 days, about 2 days to about 200 days, about 2 days to about 250 days, about 2 days to about 300 days, about 5 days to about 10 days, about 5 days to about 20 days, about 5 days to about 50 days, about 5 days to about 100 days, about 5 days to about 150 days, about 5 days to about 200 days, about 5 days to about 250 days, about 5 days to about 300 days, about 10 days to about 20 days, about 10 days to about 50 days, about 10 days to about 100 days, about 10 days to about 150 days, about 10 days to about 200 days, about 10 days to about 250 days, about 10 days to about 300 days, about 20 days to about 50 days, about 20 days to about 100 days, about 20 days to about 150 days, about 20 days to about 200 days, about 20 days to about 250 days, about 20 days to about 300 days, about 50 days to about 100 days, about 50 days to about 150 days, about 50 days to about 200 days, about 50 days to about 250 days, about 50 days to about 300 days, about 100 days to about 150 days, about 100 days to about 200 days, about 100 days to about 250 days, about 100 days to about 300 days, about 150 days to about 200 days, about 150 days to about 250 days, about 150 days to about 300 days, about 200 days to about 250 days, about 200 days to about 300 days, or about 250 days to about 300 days.

In some embodiments, the depth of the sensor array during transit is about 1 foot to about 1,000 feet. In further embodiments, the depth of the sensor during transit is about 1 foot, 5 feet, 10 feet, 50 feet, 100 feet, 200 feet, 300 feet, 400 feet, 500 feet, 600 feet, 800 feet or 1,000 feet, including increments therein. In various embodiments, the depth of the sensor during transit is about 1 foot to about 5 feet, about 1 foot to about 10 feet, about 1 foot to about 50 feet, about 1 foot to about 100 feet, about 1 foot to about 200 feet, about 1 foot to about 300 feet, about 1 foot to about 400 feet, about 1 foot to about 500 feet, about 1 foot to about 600 feet, about 1 foot to about 800 feet, about 1 foot to about 1000 feet, about 5 feet to about 10 feet, about 5 feet to about 50 feet, about 5 feet to about 100 feet, about 5 feet to about 200 feet, about 5 feet to about 300 feet, about 5 feet to about 400 feet, about 5 feet to about 500 feet, about 5 feet to about 600 feet, about 5 feet to about 800 feet, about 5 feet to about 1000 feet, about 10 feet to about 10 feet, about 10 feet to about 50 feet, about 10 feet to about 100 feet, about 10 feet to about 200 feet, about 10 feet to about 300 feet, about 10 feet to about 400 feet, about 10 feet to about 500 feet, about 10 feet to about 600 feet, about 10 feet to about 800 feet, about 10 feet to about 1000 feet, about 50 feet to about 50 feet, about 50 feet to about 100 feet, about 50 feet to about 200 feet, about 50 feet to about 300 feet, about 50 feet to about 400 feet, about 50 feet to about 500 feet, about 50 feet to about 600 feet, about 50 feet to about 800 feet, about 50 feet to about 1000 feet, about 100 feet to about 100 feet, about 100 feet to about 200 feet, about 100 feet to about 300 feet, about 100 feet to about 400 feet, about 100 feet to about 500 feet, about 100 feet to about 600 feet, about 100 feet to about 800 feet, about 100 feet to about 1000 feet, about 200 feet to about 200 feet, about 200 feet to about 300 feet, about 200 feet to about 400 feet, about 200 feet to about 500 feet, about 200 feet to about 600 feet, about 200 feet to about 800 feet, about 200 feet to about 1000 feet, about 300 feet to about 300 feet, about 300 feet to about 400 feet, about 300 feet to about 500 feet, about 300 feet to about 600 feet, about 300 feet to about 800 feet, about 300 feet to about 1000 feet, about 400 feet to about 400 feet, about 400 feet to about 500 feet, about 400 feet to about 600 feet, about 400 feet to about 800 feet, about 400 feet to about 1000 feet, about 500 feet to about 600 feet, about 500 feet to about 800 feet, about 500 feet to about 1000 feet, about 600 feet to about 800 feet, about 600 feet to about 1000 feet, or about 800 feet to about 1000 feet.

In some embodiments, the depth of the sensor array while stationary is about 1 foot to about 1,000 feet. In further embodiments, the depth of the sensor while stationary is about 1 foot, 5 feet, 10 feet, 50 feet, 100 feet, 200 feet, 300 feet, 400 feet, 500 feet, 600 feet, 800 feet, or 1,000 feet, including increments therein. In various embodiments, the depth of the sensor while stationary is about 1 foot to about 5 feet, about 1 foot to about 10 feet, about 1 foot to about 50 feet, about 1 foot to about 100 feet, about 1 foot to about 200 feet, about 1 foot to about 300 feet, about 1 foot to about 400 feet, about 1 foot to about 500 feet, about 1 foot to about 600 feet, about 1 foot to about 800 feet, about 1 foot to about 1000 feet, about 5 feet to about 10 feet, about 5 feet to about 50 feet, about 5 feet to about 100 feet, about 5 feet to about 200 feet, about 5 feet to about 300 feet, about 5 feet to about 400 feet, about 5 feet to about 500 feet, about 5 feet to about 600 feet, about 5 feet to about 800 feet, about 5 feet to about 1000 feet, about 10 feet to about 10 feet, about 10 feet to about 50 feet, about 10 feet to about 100 feet, about 10 feet to about 200 feet, about 10 feet to about 300 feet, about 10 feet to about 400 feet, about 10 feet to about 500 feet, about 10 feet to about 600 feet, about 10 feet to about 800 feet, about 10 feet to about 1000 feet, about 50 feet to about 50 feet, about 50 feet to about 100 feet, about 50 feet to about 200 feet, about 50 feet to about 300 feet, about 50 feet to about 400 feet, about 50 feet to about 500 feet, about 50 feet to about 600 feet, about 50 feet to about 800 feet, about 50 feet to about 1000 feet, about 100 feet to about 100 feet, about 100 feet to about 200 feet, about 100 feet to about 300 feet, about 100 feet to about 400 feet, about 100 feet to about 500 feet, about 100 feet to about 600 feet, about 100 feet to about 800 feet, about 100 feet to about 1000 feet, about 200 feet to about 200 feet, about 200 feet to about 300 feet, about 200 feet to about 400 feet, about 200 feet to about 500 feet, about 200 feet to about 600 feet, about 200 feet to about 800 feet, about 200 feet to about 1000 feet, about 300 feet to about 300 feet, about 300 feet to about 400 feet, about 300 feet to about 500 feet, about 300 feet to about 600 feet, about 300 feet to about 800 feet, about 300 feet to about 1000 feet, about 400 feet to about 400 feet, about 400 feet to about 500 feet, about 400 feet to about 600 feet, about 400 feet to about 800 feet, about 400 feet to about 1000 feet, about 500 feet to about 600 feet, about 500 feet to about 800 feet, about 500 feet to about 1000 feet, about 600 feet to about 800 feet, about 600 feet to about 1000 feet, or about 800 feet to about 1000 feet.

Method Parameters

In some embodiments, the sensor positioning system does not modify its position and arrangement if the location measurement reading is within a set accuracy of the respective watercraft's stored target position. In some embodiments, the set accuracy is about 0.01 nautical miles to about 10 nautical miles. In further embodiments, the set accuracy is about 0.01 nautical miles, 0.05 nautical miles, 0.1 nautical miles, 0.5 nautical miles, 1 nautical mile, 2 nautical miles, 3 nautical miles, 5 nautical miles, 6 nautical miles, 8 nautical miles, or 10 nautical miles, including increments therein. In various embodiments, the set accuracy is about 0.01 nautical miles to about 0.05 nautical miles, about 0.01 nautical miles to about 0.1 nautical miles, about 0.01 nautical miles to about 0.5 nautical miles, about 0.01 nautical miles to about 1 nautical mile, about 0.01 nautical miles to about 2 nautical miles, about 0.01 nautical miles to about 3 nautical miles, about 0.01 nautical miles to about 4 nautical miles, about 0.01 nautical miles to about 5 nautical miles, about 0.01 nautical miles to about 6 nautical miles, about 0.01 nautical miles to about 8 nautical miles, about 0.01 nautical miles to about 10 nautical miles, about 0.05 nautical miles to about 0.1 nautical miles, about 0.05 nautical miles to about 0.5 nautical miles, about 0.05 nautical miles to about 1 nautical mile, about 0.05 nautical miles to about 2 nautical miles, about 0.05 nautical miles to about 3 nautical miles, about 0.05 nautical miles to about 4 nautical miles, about 0.05 nautical miles to about 5 nautical miles, about 0.05 nautical miles to about 6 nautical miles, about 0.05 nautical miles to about 8 nautical miles, about 0.05 nautical miles to about 10 nautical miles, about 0.1 nautical miles to about 0.1 nautical miles, about 0.1 nautical miles to about 0.5 nautical miles, about 0.1 nautical miles to about 1 nautical mile, about 0.1 nautical miles to about 2 nautical miles, about 0.1 nautical miles to about 3 nautical miles, about 0.1 nautical miles to about 4 nautical miles, about 0.1 nautical miles to about 5 nautical miles, about 0.1 nautical miles to about 6 nautical miles, about 0.1 nautical miles to about 8 nautical miles, about 0.1 nautical miles to about 10 nautical miles, about 0.5 nautical miles to about 0.5 nautical miles, about 0.5 nautical miles to about 1 nautical mile, about 0.5 nautical miles to about 2 nautical miles, about 0.5 nautical miles to about 3 nautical miles, about 0.5 nautical miles to about 4 nautical miles, about 0.5 nautical miles to about 5 nautical miles, about 0.5 nautical miles to about 6 nautical miles, about 0.5 nautical miles to about 8 nautical miles, about 0.5 nautical miles to about 10 nautical miles, about 1 nautical mile to about 1 nautical mile, about 1 nautical mile to about 2 nautical miles, about 1 nautical mile to about 3 nautical miles, about 1 nautical mile to about 4 nautical miles, about 1 nautical mile to about 5 nautical miles, about 1 nautical mile to about 6 nautical miles, about 1 nautical mile to about 8 nautical miles, about 1 nautical mile to about 10 nautical miles, about 2 nautical miles to about 2 nautical miles, about 2 nautical miles to about 3 nautical miles, about 2 nautical miles to about 4 nautical miles, about 2 nautical miles to about 5 nautical miles, about 2 nautical miles to about 6 nautical miles, about 2 nautical miles to about 8 nautical miles, about 2 nautical miles to about 10 nautical miles, about 3 nautical miles to about 3 nautical miles, about 3 nautical miles to about 4 nautical miles, about 3 nautical miles to about 5 nautical miles, about 3 nautical miles to about 6 nautical miles, about 3 nautical miles to about 8 nautical miles, about 3 nautical miles to about 10 nautical miles, about 4 nautical miles to about 4 nautical miles, about 4 nautical miles to about 5 nautical miles, about 4 nautical miles to about 6 nautical miles, about 4 nautical miles to about 8 nautical miles, about 4 nautical miles to about 10 nautical miles, about 5 nautical miles to about 6 nautical miles, about 5 nautical miles to about 8 nautical miles, about 5 nautical miles to about 10 nautical miles, about 6 nautical miles to about 8 nautical miles, about 6 nautical miles to about 10 nautical miles, or about 8 nautical miles to about 10 nautical miles.

In some embodiments, the sensor positioning system overrides a stored target positions with a respective stored location measurement if the location measurement value is within a set accuracy of the respective watercraft's stored target position. In some embodiments, the set accuracy is about 0.01 nautical miles to about 10 nautical miles. In further embodiments, the set accuracy is about 0.01 nautical miles, 0.05 nautical miles, 0.1 nautical miles, 0.5 nautical miles, 1 nautical mile, 2 nautical miles, 3 nautical miles, 5 nautical miles, 6 nautical miles, 8 nautical miles, or 10 nautical miles, including increments therein. In various embodiments, the set accuracy is about 0.01 nautical miles to about 0.05 nautical miles, about 0.01 nautical miles to about 0.1 nautical miles, about 0.01 nautical miles to about 0.5 nautical miles, about 0.01 nautical miles to about 1 nautical mile, about 0.01 nautical miles to about 2 nautical miles, about 0.01 nautical miles to about 3 nautical miles, about 0.01 nautical miles to about 4 nautical miles, about 0.01 nautical miles to about 5 nautical miles, about 0.01 nautical miles to about 6 nautical miles, about 0.01 nautical miles to about 8 nautical miles, about 0.01 nautical miles to about 10 nautical miles, about 0.05 nautical miles to about 0.1 nautical miles, about 0.05 nautical miles to about 0.5 nautical miles, about 0.05 nautical miles to about 1 nautical mile, about 0.05 nautical miles to about 2 nautical miles, about 0.05 nautical miles to about 3 nautical miles, about 0.05 nautical miles to about 4 nautical miles, about 0.05 nautical miles to about 5 nautical miles, about 0.05 nautical miles to about 6 nautical miles, about 0.05 nautical miles to about 8 nautical miles, about 0.05 nautical miles to about 10 nautical miles, about 0.1 nautical miles to about 0.1 nautical miles, about 0.1 nautical miles to about 0.5 nautical miles, about 0.1 nautical miles to about 1 nautical mile, about 0.1 nautical miles to about 2 nautical miles, about 0.1 nautical miles to about 3 nautical miles, about 0.1 nautical miles to about 4 nautical miles, about 0.1 nautical miles to about 5 nautical miles, about 0.1 nautical miles to about 6 nautical miles, about 0.1 nautical miles to about 8 nautical miles, about 0.1 nautical miles to about 10 nautical miles, about 0.5 nautical miles to about 0.5 nautical miles, about 0.5 nautical miles to about 1 nautical mile, about 0.5 nautical miles to about 2 nautical miles, about 0.5 nautical miles to about 3 nautical miles, about 0.5 nautical miles to about 4 nautical miles, about 0.5 nautical miles to about 5 nautical miles, about 0.5 nautical miles to about 6 nautical miles, about 0.5 nautical miles to about 8 nautical miles, about 0.5 nautical miles to about 10 nautical miles, about 1 nautical mile to about 1 nautical mile, about 1 nautical mile to about 2 nautical miles, about 1 nautical mile to about 3 nautical miles, about 1 nautical mile to about 4 nautical miles, about 1 nautical mile to about 5 nautical miles, about 1 nautical mile to about 6 nautical miles, about 1 nautical mile to about 8 nautical miles, about 1 nautical mile to about 10 nautical miles, about 2 nautical miles to about 2 nautical miles, about 2 nautical miles to about 3 nautical miles, about 2 nautical miles to about 4 nautical miles, about 2 nautical miles to about 5 nautical miles, about 2 nautical miles to about 6 nautical miles, about 2 nautical miles to about 8 nautical miles, about 2 nautical miles to about 10 nautical miles, about 3 nautical miles to about 3 nautical miles, about 3 nautical miles to about 4 nautical miles, about 3 nautical miles to about 5 nautical miles, about 3 nautical miles to about 6 nautical miles, about 3 nautical miles to about 8 nautical miles, about 3 nautical miles to about 10 nautical miles, about 4 nautical miles to about 4 nautical miles, about 4 nautical miles to about 5 nautical miles, about 4 nautical miles to about 6 nautical miles, about 4 nautical miles to about 8 nautical miles, about 4 nautical miles to about 10 nautical miles, about 5 nautical miles to about 6 nautical miles, about 5 nautical miles to about 8 nautical miles, about 5 nautical miles to about 10 nautical miles, about 6 nautical miles to about 8 nautical miles, about 6 nautical miles to about 10 nautical miles, or about 8 nautical miles to about 10 nautical miles.

Some embodiments comprise a step of the sensor positioning system remeasuring its current position after a period of time. In some embodiments, the period of time is about 1 minute to about 24 hours. In further embodiments, the period of time is about 1 minute, 5 minutes, 10 minutes, 30 minutes, 1 hour, 2 hours, 5 hours, 10 hours, 15 hours, 20 hours, or 24 hours, including increments therein. In various embodiments, the period of time is about 1 minute to about 5 minutes, about 1 minute to about 10 minutes, about 1 minute to about 30 minutes, about 1 minute to about 1 hour, about 1 minute to about 2 hours, about 1 minute to about 5 hours, about 1 minute to about 10 hours, about 1 minute to about 15 hours, about 1 minute to about 20 hours, about 1 minute to about 24 hours, about 5 minutes to about 10 minutes, about 5 minutes to about 30 minutes, about 5 minutes to about 1 hour, about 5 minutes to about 2 hours, about 5 minutes to about 5 hours, about 5 minutes to about 10 hours, about 5 minutes to about 15 hours, about 5 minutes to about 20 hours, about 5 minutes to about 24 hours, about 10 minutes to about 10 minutes, about 10 minutes to about 30 minutes, about 10 minutes to about 1 hour, about 10 minutes to about 2 hours, about 10 minutes to about 5 hours, about 10 minutes to about 10 hours, about 10 minutes to about 15 hours, about 10 minutes to about 20 hours, about 10 minutes to about 24 hours, about 30 minutes to about 30 minutes, about 30 minutes to about 1 hour, about 30 minutes to about 2 hours, about 30 minutes to about 5 hours, about 30 minutes to about 10 hours, about 30 minutes to about 15 hours, about 30 minutes to about 20 hours, about 30 minutes to about 24 hours, about 1 hour to about 1 hour, about 1 hour to about 2 hours, about 1 hour to about 5 hours, about 1 hour to about 10 hours, about 1 hour to about 15 hours, about 1 hour to about 20 hours, about 1 hour to about 24 hours, about 2 hours to about 2 hours, about 2 hours to about 5 hours, about 2 hours to about 10 hours, about 2 hours to about 15 hours, about 2 hours to about 20 hours, about 2 hours to about 24 hours, about 5 hours to about 5 hours, about 5 hours to about 10 hours, about 5 hours to about 15 hours, about 5 hours to about 20 hours, about 5 hours to about 24 hours, about 10 hours to about 10 hours, about 10 hours to about 15 hours, about 10 hours to about 20 hours, about 10 hours to about 24 hours, about 15 hours to about 20 hours, about 15 hours to about 24 hours, or about 20 hours to about 24 hours.

In some embodiments, the sensor positioning system does not modify its sensor array depth if the array depth measurement reading is within a set accuracy of the respective target array depth. In some embodiments, the set accuracy of the respective watercraft's stored target depth is about 10 feet to about 100 feet. In further embodiments, the set accuracy is about 10 feet, 20 feet, 30 feet, 40 feet, 50 feet, 60 feet, 70 feet, 80 feet, 90 feet, or 100 feet, including increments therein. In various embodiments, the set accuracy is about 10 feet to about 20 feet, about 10 feet to about 30 feet, about 10 feet to about 40 feet, about 10 feet to about 50 feet, about 10 feet to about 60 feet, about 10 feet to about 70 feet, about 10 feet to about 80 feet, about 10 feet to about 90 feet, about 10 feet to about 100 feet, about 20 feet to about 30 feet, about 20 feet to about 40 feet, about 20 feet to about 50 feet, about 20 feet to about 60 feet, about 20 feet to about 70 feet, about 20 feet to about 80 feet, about 20 feet to about 90 feet, about 20 feet to about 100 feet, about 30 feet to about 30 feet, about 30 feet to about 40 feet, about 30 feet to about 50 feet, about 30 feet to about 60 feet, about 30 feet to about 70 feet, about 30 feet to about 80 feet, about 30 feet to about 90 feet, about 30 feet to about 100 feet, about 40 feet to about 40 feet, about 40 feet to about 50 feet, about 40 feet to about 60 feet, about 40 feet to about 70 feet, about 40 feet to about 80 feet, about 40 feet to about 90 feet, about 40 feet to about 100 feet, about 50 feet to about 50 feet, about 50 feet to about 60 feet, about 50 feet to about 70 feet, about 50 feet to about 80 feet, about 50 feet to about 90 feet, about 50 feet to about 100 feet, about 60 feet to about 60 feet, about 60 feet to about 70 feet, about 60 feet to about 80 feet, about 60 feet to about 90 feet, about 60 feet to about 100 feet, about 70 feet to about 70 feet, about 70 feet to about 80 feet, about 70 feet to about 90 feet, about 70 feet to about 100 feet, about 80 feet to about 80 feet, about 80 feet to about 90 feet, about 80 feet to about 100 feet, or about 90 feet to about 100 feet.

In some embodiments, the sensor positioning system overrides a stored target depth with a respective stored depth measurement if the depth measurement value is within a set accuracy of the respective watercraft's stored target depth. In some embodiments, the set accuracy of the respective watercraft's stored target depth is about 10 feet to about 100 feet. In further embodiments, the set accuracy of the respective watercraft's stored target depth is about 10 feet, 20 feet, 30 feet, 40 feet, 50 feet, 60 feet, 70 feet, 80 feet, 90 feet, or 100 feet, including increments therein. In various embodiments, the set accuracy of the respective watercraft's stored target depth is about 10 feet to about 20 feet, about 10 feet to about 30 feet, about 10 feet to about 40 feet, about 10 feet to about 50 feet, about 10 feet to about 60 feet, about 10 feet to about 70 feet, about 10 feet to about 80 feet, about 10 feet to about 90 feet, about 10 feet to about 100 feet, about 20 feet to about 30 feet, about 20 feet to about 40 feet, about 20 feet to about 50 feet, about 20 feet to about 60 feet, about 20 feet to about 70 feet, about 20 feet to about 80 feet, about 20 feet to about 90 feet, about 20 feet to about 100 feet, about 30 feet to about 30 feet, about 30 feet to about 40 feet, about 30 feet to about 50 feet, about 30 feet to about 60 feet, about 30 feet to about 70 feet, about 30 feet to about 80 feet, about 30 feet to about 90 feet, about 30 feet to about 100 feet, about 40 feet to about 40 feet, about 40 feet to about 50 feet, about 40 feet to about 60 feet, about 40 feet to about 70 feet, about 40 feet to about 80 feet, about 40 feet to about 90 feet, about 40 feet to about 100 feet, about 50 feet to about 50 feet, about 50 feet to about 60 feet, about 50 feet to about 70 feet, about 50 feet to about 80 feet, about 50 feet to about 90 feet, about 50 feet to about 100 feet, about 60 feet to about 60 feet, about 60 feet to about 70 feet, about 60 feet to about 80 feet, about 60 feet to about 90 feet, about 60 feet to about 100 feet, about 70 feet to about 70 feet, about 70 feet to about 80 feet, about 70 feet to about 90 feet, about 70 feet to about 100 feet, about 80 feet to about 80 feet, about 80 feet to about 90 feet, about 80 feet to about 100 feet, or about 90 feet to about 100 feet.

Reference to the Figures

Referring to FIG. 1, the first preferred mode of the sensor array positioning system 100 is comprised of a first watercraft 101, a second watercraft 102, a tow cable 103, one or more buoyancy engines 104 and a sensor array 105. A control station commands the sensor array positioning system 100 to place the sensor array 105 at a specified sensor depth 110, position and velocity by specifying the watercrafts' 101 102 positions and velocities, the separation distance 120 between the first watercraft 101 and the second watercraft 102 and the buoyancy of one or more buoyancy engines 104.

A top view of an exemplary first preferred mode of the sensor array positioning system 200 is shown in FIG. 2A, whereas a sensor array 205 is strung between two watercrafts 201. A variation of the exemplary first preferred mode of the sensor array positioning system 210 is shown in FIG. 2B, whereas more than two watercrafts 201 and more than two sensor arrays 205, are arranged in an open chain, closed loop or reticulum. As the non-rigid sensor array 205 may bow under the force of any non-parallel current 230, the positional accuracy of the data measured thereby may be reduced.

A top view of the exemplary second preferred mode of the sensor array positioning system 300 is shown in FIG. 3A, whereas a stay tow cable 303 is implemented to support the non-rigid sensor array 305 from the force of any non-parallel current 330. A variation of the second preferred mode of the sensor array positioning system 310 is shown in FIG. 3B, whereas more than two watercraft 301 and more than two sensor arrays 305, may be arranged in an open chain, closed loop or reticulum.

A top view of the third preferred mode of the sensor array positioning system 400 is shown in FIG. 4A, whereas two stay tow cables 403 are implemented to support the non-rigid sensor array 405 from the force of any non-parallel current 430. A variation of the second preferred mode of the sensor array positioning system 410 is shown in FIG. 4B, whereas more than two watercraft 401 and more than two sensor arrays 405, may be arranged in an open chain, closed loop or reticulum.

In some embodiments, the two or more watercrafts 101, 102, 201, 301, 401 may comprise a master watercraft and a slave watercraft, wherein the control station communicates target system parameters to the master watercraft, and wherein the master watercraft may command one or more slave watercrafts.

In some embodiments, a user may program one or more target system parameters through the control station, comprising a sensor position, a sensor velocity, a sensor heading, a sensor depth, the separation of two connected watercrafts, engaging the sensor, disengaging the sensor or any combination thereof. The control station may then calculate and send the master watercraft a series of operational instructions comprising two or more watercraft positions, one or more watercraft velocities, one or more watercraft headings, one or more buoyancy engine buoyancies or any combination thereof. In some embodiments, one or more target parameters may be grouped into modes.

Figure 5:
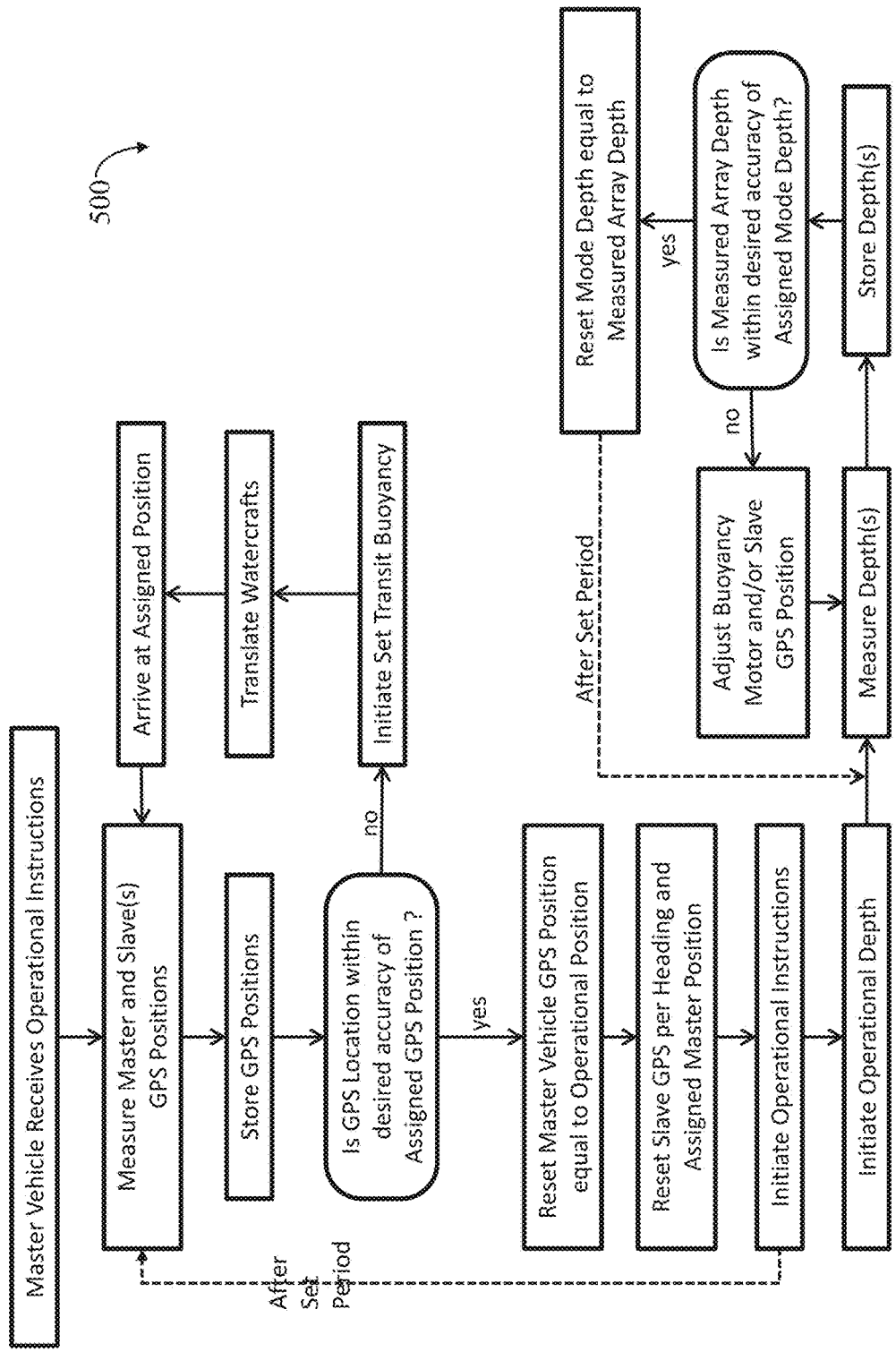
FIG. 5 shows a block diagram of an exemplary algorithm for controlling an unmanned sensor positioning system comprising a master and a slave unmanned vehicle and FIG. 6 shows an exemplary schematic side view diagram illustrating the relationship between the speed of sound and the shape of refracted sound propagation rays and ocean depth.

An exemplary method 500 of controlling the position of two or more watercrafts through a single master vehicle is shown in FIG. 5, whereas once the master watercraft receives a series of command instructions from the control station, the master watercraft may measure its current GPS position, and collect GPS measurement positions of one or more slave watercrafts. After storing the GPS measurement positions, the master watercraft may determine whether its, and the one or more slave master watercrafts, are positioned within a set accuracy tolerance. This accuracy tolerance value may be programmed into the command center by a user to be about 0.01 nautical miles to 10 nautical miles.

If the GPS measurement positions of one or more of the watercrafts are not within the set accuracy tolerance of the operational positions, the master watercraft may calculate it's, and one or more slave watercrafts', velocities, headings and transit periods necessary to reach the operational watercraft locations. The master watercraft may then set its, and one or more slave watercrafts' velocities and headings to the respective calculated values for the calculated transit period, and may set the buoyancy of one or more buoyancy engines to one or more preset transit values. Once the watercrafts translate for a period of time equal to the calculated transit period, the master watercraft may measure its current GPS position, collect GPS measurement positions of one or more slave watercrafts, store the GPS positions, recalculate its positional accuracy and continue to adjust its position until the GPS positions are within the set accuracy tolerance.

Once the measured GPS positions of the master watercraft and the slave watercraft(s) are within the set tolerance of the operational positions, the master watercraft may override its stored GPS position with the master watercraft operational position, and override the stored GPS position(s) of the one or more slave watercrafts with their respective operational positions.

Thereafter, the master watercraft may initiate the operational parameters assigned by the control center to perform the function desired by the user.

After a set period of time, the master watercraft may remeasure its GPS position, and the GPS position(s) of one or more slave watercrafts to ensure that its position and the position of the one or more watercrafts are within the desired watercraft operational positions.

If the user programs a target buoyancy system parameter, the master watercraft may then command one or more buoyancy engines to the set operational buoyancies. After a short period of time, to allow the one or more sensor arrays to stabilize, the master watercraft may measure and store the values of the one or more depth sensors. If the depth measurement or measurements are not within a set depth tolerance, the master watercraft may adjust the buoyancy of one or more buoyancy engines and remeasure and store the values of the one or more depth sensors until the depth measurement(s) are within a set depth tolerance. Thereafter, the master watercraft may override the stored depth measurement(s) with the respective operational depth(s).

After a set period of time, the master watercraft may remeasure the array depths, and readjust the buoyancy engines buoyancies if necessary.

Figure 6:
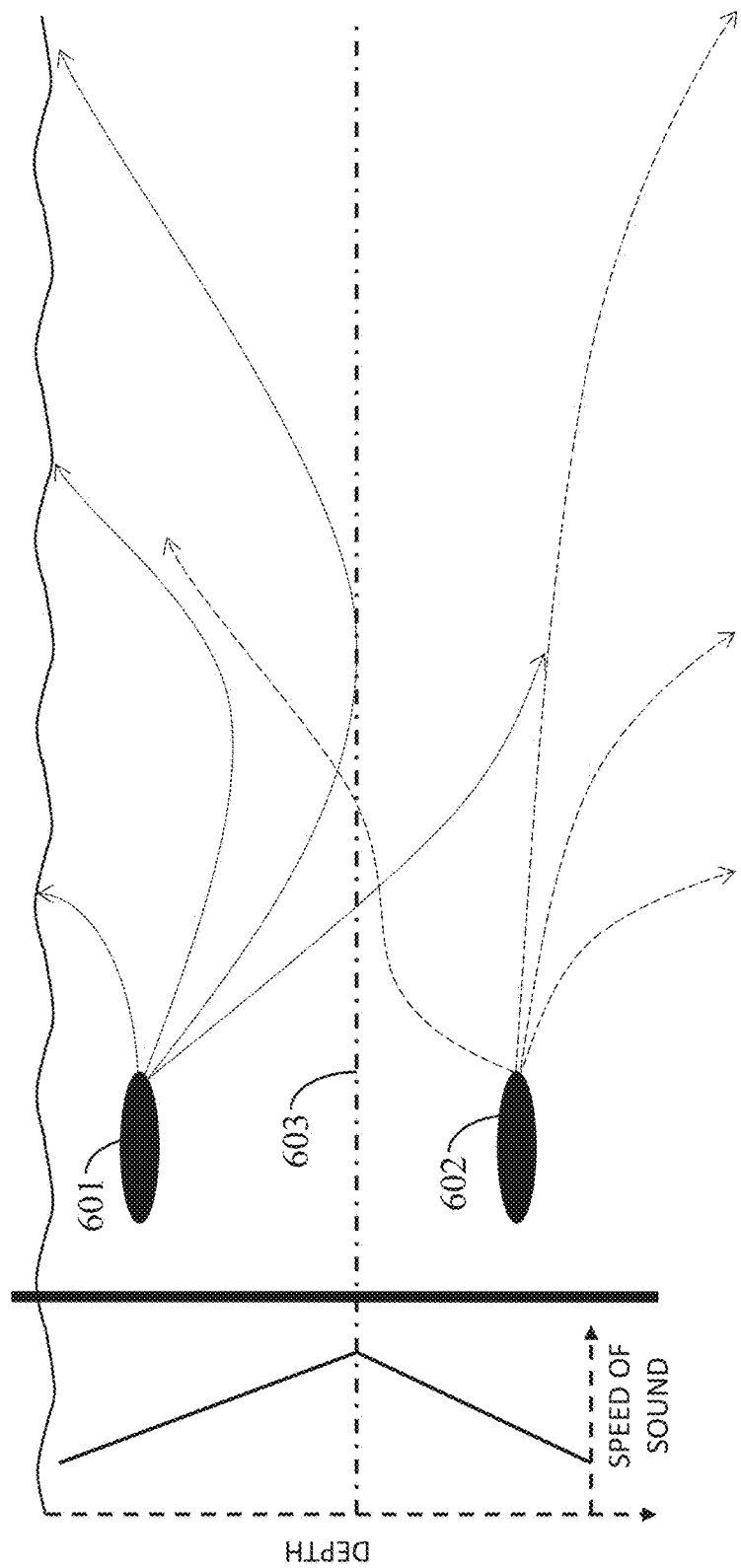

FIG. 6 is an exemplary illustration of the effect of the depth on the speed of sound in seawater. The cumulative effect of temperature, water pressure and salinity within the ocean may combine to form regions of minimum sound speed in a water column. Pressure in the ocean may increase linearly with depth, although temperature generally falls rapidly in the main thermocline from the surface to around a thousand meters deep, then remains almost unchanged from there to the ocean floor in the deep sea. Near the surface, the rapidly falling temperature may cause a decrease in sound speed, or a negative sound speed gradient. With increasing depth, the increasing pressure may cause an increase in sound speed, or a positive sound speed gradient. The depth where the sound speed is at a minimum is called the sonic layer depth (SLD) 603 or the sound channel axis. Through refraction, sound refract towards the area of slowest speed as it propagates. As such, this phenomenon may cause sound waves to bend away from the SLD 603.

As seen, a sound wave emitted from a source 601 above the SLD 603 may refract upwards towards the ocean surface, unless emitted at an angle negative to horizontal and/or at an intensity sufficient to overcome the upwards force of refraction. Likewise, as shown in FIG. 6, a sound wave emitted from a source 602 below the SLD 603 naturally refract downwards to the ocean floor, unless emitted at an angle positive to horizontal and/or at an intensity sufficient to overcome the downwards force of refraction.

Certain Definitions

As used herein, and unless otherwise specified, the term "GPS position" refers to the Global Positioning System, also known as Navstar GPS, which is a global navigation satellite system that provides location and time information in all weather conditions, anywhere on or near the Earth where there is an unobstructed line of sight to four or more GPS satellites.

As used herein, and unless otherwise specified, the term "heading" refers to the compass direction in which a watercraft is moving or pointing towards.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 pounds, 30.0 pounds, 20.0 pounds, 10.0 pounds, 5.0 pounds, 1.0 pound, 0.9 pounds, 0.8 pounds, 0.7 pounds, 0.6 pounds, 0.5 pounds, 0.4 pounds, 0.3 pounds, 0.2 pounds, 0.1 pounds, 0.05 pounds, or 0.01 pounds of a given value or range. In certain embodiments, the term "about" or "approximately" means within 60.0 feet, 50.0 feet, 40.0 feet, 30.0 feet, 20.0 feet, 10.0 feet, 5.0 feet, 1.0 feet, 0.5 feet, or 0.1 foot, of a given value or range. In certain embodiments, the term "about" or "approximately" means within 5.0 millimeters, 1.0 millimeter, 0.9 millimeters, 0.8 millimeters, 0.7 millimeters, 0.6 millimeters, 0.5 millimeters, 0.4 millimeters, 0.3 millimeters, 0.2 millimeters or 0.1 millimeters, 0.05 millimeters, or 0.01 millimeters of a given value or range. In certain embodiments, the term "about" or "approximately" means within 50.0 days, 40.0 days, 30.0 days, 20.0 days, 10.0 days, 5.0 days, 1.0 day, 0.5 days, or 0.1 days of a given value or range. In certain embodiments, the term "about" or "approximately" means within 40.0 hours, 30.0 hours, 20.0 hours, 10.0 hours, 5.0 hours, 1.0 hours, 0.9 hours, 0.8 hours, 0.7 hours, 0.6 hours, 0.5 hours, 0.4 hours, 0.3 hours, 0.2 hours, or 0.1 hours of a given value or range. In certain embodiments, the term "about" or "approximately" means within 40.0 minutes, 30.0 minutes, 20.0 minutes, 10.0 minutes, 5.0 minutes, 1.0 pound, 0.9 minutes, 0.8 minutes, 0.7 minutes, 0.6 minutes, 0.5 minutes, 0.4 minutes, 0.3 minutes, 0.2 minutes, or 0.1 minutes of a given value or range.

Other Non-Limiting Embodiments

The information disclosed and claimed below relates generally to the field of ocean monitoring with acoustic, electromagnetic, pressure, or optical sensors. More specifically, it provides a system comprising autonomous vehicles and buoyancy devices to control the position, depth and orientation of a series of sensors mounted on a flexible cable.

There is a long-felt but unresolved need to equip marine robotic vehicles with sensors capable of detecting undersea activity, both natural and man-made, using sensors with that have the correct physical dimensions. The sensors must be sufficiently large to exploit long acoustic and electromagnetic waves. The sensors must be placed at to proper depth to detect physical phenomena. In addition, the sensors must be oriented properly such that the beam patterns formed by the sensor field detect the desired signal while rejecting undesired noise. In many cases, with most efficient method for constructing a large sensor array is to place multiple sensors in a flexible hose that contains sensors and associated electronics. The flexible hose is convenient for transporting the sensor array to the desired location. When the sensor array is to be used, it is most effective when the flexible hose is stretched to achieve a large enough linear displacement to sense signals at the acoustic or radio frequency of concern. Historically, sensor arrays have been attached to ships or submarines with a tow cable. The ship or submarine maintains the flexible array straight by moving though the water. Drag resistance on the array keeps it straight. The depth can be adjusted by changing the length of the associated tow cable extending from the ship or submarine. Array orientation is maintained by adjusting the heading of the ship or submarine tow vehicle. Autonomous marine vehicles often lack the size and power to carry a large tow cable or overcome the drag forces associated with moving a large array through the water. Therefore there is a need for a means of positioning the array at the proper depth, along the proper orientation and maintaining the array shape with little or no movement through the water. In addition, the ability to maintain the shape and position of a sensor array without movement through the water eliminates the background noise cause by water flow across the array surface, improving the signal to noise ratio of the received signal.

This invention provides a vehicle system and methodology that can be used to properly position a large flexible sensor array at the appropriate location, depth and orientation using two autonomous vehicles and a number of buoyancy engines. The autonomous vehicles control the geographic position, the shape and the orientation of the array, while a system of depth sensors, buoyancy engines and associated control software position the array at the desired depth. The system consists of at least two unmanned, self-controlled vessels; two tow cables, a flexible tube that contains a number of acoustic sensors, depth (pressure) sensors, and a number of variable buoyancy compensation devices, also known as buoyancy engines. The autonomous vehicles may be either a surface vehicle or a submarine vehicle.

Also provided is a control system that allows for the coordinated interaction between a series of depth sensors and buoyancy engines that position the array at the desired depth in response to operator input.

The system is put into operation when a remote operator sends a message via radio or acoustic signaling means to the master autonomous vehicle. The control message assigns a geographic location for the system, a sensor depth, and an axis of sensor orientation. This message is transferred either directly or indirectly to the slave autonomous vehicle as well. The vehicles will use their propulsion means to tow the sensor array to the vicinity of the assigned location. On arrival at the assigned location, the master vehicle will stop and use it's propulsion means only as needed to maintain the assigned position.

On arrival at the assigned location, the slave autonomous vehicle will maneuver such that the axis between the master and slave vehicle is perpendicular to the assigned search direction. The slave vehicle will maneuver to achieve a position that stretches the sensor array such that it achieves the required linear distance to form the correct sensor aperture.

The array control system will direct the sensor array to achieve an assigned depth calculated to optimize the sensor performance. The array will achieve the desired depth through the coordinated action of a series of depth sensors and buoyance engines. When the depth sensors indicate a depth less than the prescribed depth, the control logic will direct the associated buoyancy engine to change its physical size such that it will displace less seawater, resulting in negative buoyancy in that section of the array. Conversely, when a depth sensor indicates a depth deeper than assigned depth, the control logic will direct the associated buoyancy engine to increase its physical size, producing positive buoyancy in that section of the sensor array.

Also provided is a communications device in each autonomous vehicle that receives commands from a remote location that direct the vehicles to a geographic location, assign an array operating depth and a directional orientation of the array.

Also provided is a control circuit that provides buoyancy adjustment commands to buoyancy engines in response to the difference between the assigned array depth and the measured depth in the vicinity of each buoyancy engine.

Also provided is a remote interface that provides inputs for desired sensor location, orientation, and depth to the autonomous vehicles such that the desired sensor array, orientation and depth are achieved as a result of the position of the vehicles. This system also monitors the conditions of the sensor array and processes the data collected by the sensor array.

FIG. 1 is an elevation drawing showing two autonomous vehicles connected to opposite ends of a sensor array via tow cables that contain power and data transmission capacity to acoustic and non-acoustic sensors housed within the sensor aperture. The sensor array contains acoustic and non-acoustic sensors, including pressure sensors that measure the depth of various portions of the array beneath the ocean surface. The sensor array has multiple buoyancy engines attached that add positive or negative buoyancy when commanded by the array control system.

FIG. 5 is a flow chart describing the computer logic that navigates two autonomous vehicles in order to properly position an acoustic array at the proper location, at the proper compass orientation and at the proper depth in response to input from a remote operator. This logic uses operator inputs for search location, sensor array heading, desired sensor depth during transit to the search area and desired array depth while searching in a stationary position. This allows for a relatively shallow sensor depth during transit to the assigned search area in order to minimize the amount of drag that the sensor system creates when it is not searching. The master vehicle will proceed directly to the assigned search location and then seek to maintain its position. The slave vehicle will proceed to a position that is offset by a factor based on the combined length of the sensor array and tow cables. The selected position will be in the direction of the desired array heading. When the master and slave vehicles arrive at their assigned locations, the resulting tension on the sensor array will cause the array to assume a linear shape, optimizing the search aperture. When the master and slave vehicles are in the vicinity of the search area, the control system will assign a separate control system to place the sensor array at its search depth.

FIG. 5 is a flow chart describing the computer logic that maintains the desired depth of the sensor array via multiple buoyancy compensation devices. The described circuit compares the assigned sensor depth, which may be a transit depth or a search depth, and compares it to the depth sensed at the multiple depth sensor locations along the sensor array. Each depth sensor is paired with a buoyancy engine, which is a device capable of changing its volume and, therefore, the amount of seawater that is displaced. When the volume of sea water displaced exceeds the weight of the buoyancy engine components, positive buoyancy, or upward force, is created. When the volume of seawater displaced by the buoyancy engine is less than the weight of the buoyancy engine, negative buoyancy, or downward force, is created. Using the logic disclosed in FIG. 3, the volume of multiple buoyancy engines is adjusted until the depth sensed is approximately equal to the assigned depth.

Throughout history, the world's oceans and the underlying seabed have been a source of food, an efficient path for transportation and a source for raw materials. As a result, control of the ocean has been an arena for competition between nations, corporations, private citizens and even criminal enterprises. The competition has more recently spread the area beneath the surface of the ocean, as the concealment offered by the ocean facilitates covert access to military criminal activity. As a result, there is an increasing need to be able to detect subsurface activity to protect territory, stop illicit trafficking, defend undersea infrastructure or other commercial activity on the high seas, in seaport areas or along the coast. Detection of undersea activity has traditionally been conducted by deploying acoustic or electromagnetic sensors from ships, submarines or airplanes. In addition, in some cases bottom mounted undersea sensors have been connected via electronic means to a monitoring network. Each of these means has significant limitations that impact the amount of coverage that can be achieved. Ships, submarines and aircraft are costly due to the expense of fuel, crew, and maintenance costs. Fixed systems are vulnerable to discovery and destruction by the adversaries that they were intended to detect. Therefore, there is a need for an unmanned, autonomous, mobile means of deploying undersea sensors at an affordable cost and without the risk of discovery and destruction by an adversary.

Autonomous vehicles have been developed to meet the need for a low cost, mobile method of deploying undersea sensing capability. While these autonomous vehicle have some capability, they have been limited in their ability to deploy sensors with sufficient capability because the sensors with the necessary capability have historically been very large linear arrays containing hydrophones inserted into a long flexible tube with the associated electronics. The capability of the sensor is dependent on maintain the flexible tube straight in order to achieve he required spacing between the hydrophones in the flexible tube. The shape of the tube has historically been maintained by pulling it through the water with a ship or submarine. The drag forces created by the movement through the water sustain a tension on the array that keeps the proper spacing. The depth of the sensor array beneath the ocean surface is achieved weighting the sensor array such that it is negatively buoyant, and then adjusting the length of the tow cable. The array will then settle to a depth that is a function of the tow speed and the length of the tow cable. The compass orientation of the array is achieved by adjusting the course of the tow vessel. The movement of the sensor array through the water has a negative side effect in that the flow of water along the array creates noise that has the potential to mask the noise that the system is designed to detect.

Autonomous vehicles typically lack the power and endurance to pull a large sensor array through the water with sufficient speed to achieve the tension required to maintain the shape, depth and orientation of the array. Therefore, there is a need for a means through which autonomous vehicles can support a large linear sensor array at the requisite depth and compass orientation without expending the energy required to pull the array at speed through the water. The ability to establish the proper shape, depth and orientation of the array with minimal movement through the water has the additional benefit of reducing the amount of undesired flow induced noise at the location of the sensors.

FIGS. 1, 2A, 2B, 3A, 3B, 4A, and 4B disclose systems consisting of a master autonomous vehicles and slave autonomous vehicle attached via two tow cables to a sensor assembly outfitted with acoustic sensors, depth sensors, and buoyancy compensation devices known as buoyancy engines. The tow cables contain electrical conductors for transferring power and data between the autonomous vehicles, the array sensors and the buoyancy engines. The autonomous vehicles receive operating instruction from a remote station via radio or acoustic communications. The geographic position, sensor array orientation and sensor depth of the system is achieved autonomously in response to input from a remote station. The master autonomous vehicle navigates to the assigned geographic position for the sensor system. The slave autonomous vehicle navigates to a position that is offset from the position of the master vehicle by a distance and in a direction such that the sensor array will be oriented in the desired direction when both vehicles have achieved their assigned location. The distance between the master and slave vehicles is a fraction of the combined length of the sensor array and tow cables, with the fraction allowing the sensor array to sink to the desired search depth. When the system has arrived at the desired search location, the sensor array is set to the proper search depth by a series of buoyancy engines that expand to provide upward force on the array (buoyancy) or contract to provide downward force on the array (negative buoyancy). The signals to the buoyancy engine are generated by a logic circuit that compares the depth assigned to the array by the operator at a remote location and the depth that is sensed by a depth sensor. If the depth that is sensed by the depth detector is shallower than the assigned search depth, the buoyancy engine is directed to contract, generating negative buoyancy. If the depth sensed by the associated depth detector is deeper than the depth assigned by the operator, the buoyancy engine is directed to expand, creating positive buoyancy.

FIG. 5 discloses the control logic for the system that sets the assigned location of the master and slave autonomous vehicles when an operator at a remote location assigns a system search area, sensor array orientation, sensor depth for transit and sensor depth for search.

FIG. 5 discloses the control system logic for the control of buoyancy engines in response to assigned search depth, transit depth, and the depth sensed by the depth detectors associated with each of the buoyancy engines.

The invention claimed is a combination of multiple autonomous watercraft configured to autonomously position a sensor array at a selected geographic location, compass heading, and water depth, comprising two or more autonomous water craft wherein the autonomous vessels are connected to a linear sensor array via tow cables capable of transporting electrical power and data between the sensors and the two autonomous vehicles; and electronics capable of processing the output of the sensor array and transmitting selected data or information to other vessels or to facilities on shore.

Further, the sensor array and tow cables may contain buoyancy engines capable of changing the depth of the sensor array in response to commands from a remote operator.

Further, the sensor array may contain acoustic sensors to process underwater sound, with supporting non-acoustic sensors to determine sensor array depth and compass heading.

Further, the sensor array may contain electromagnetic sensors to determine changes in electromagnetic field, with supporting non-acoustic sensors to determine sensor array depth and compass heading.

Further, the combination comprises a central control station located on a vessel, on an aircraft, or on shore, that processes the sensor outputs and vessel data from multiple autonomous vehicles.

Further, the autonomous vessels are equipped with means to characterize received signals and provide a message report to a central control station when pre-determined signal criteria are recognized.

Further, the flexible sensor array floating in water can maintain a linear shape, orientation and depth without movement through the water.

This invention provides a vehicle system and methodology that can be used to properly position a large flexible sensor array at the appropriate location, depth and orientation using two autonomous vehicles and a number of buoyancy engines. The autonomous vehicles control the geographic position, the shape and the orientation of the array, while a system of depth sensors, buoyancy engines and associated control software position the array at the desired depth. The system consists of at least two unmanned, self-controlled vessels; two tow cables, a flexible tube that contains a number of acoustic sensors, depth (pressure) sensors, and a number of variable buoyancy compensation devices. The autonomous vehicles may be either surface vehicles or submarine vehicles.

What is claimed is:

1. A sensor array positioning system comprising:
   a) a sensor array having a first end and a second end;
   b) two or more unmanned watercrafts;
   c) at least two tow cables, each having a proximal end and a distal end; and
   d) a control station which directs the watercrafts;
   provided that the system has an uninterrupted operation period of about 2 days to about 300 days.

2. The system of claim 1, wherein the two or more watercrafts are connected by the sensor array, a primary tow cable, and a secondary tow cable.

3. The system of claim 2, wherein the proximal end of the primary tow cable is attached to a first watercraft, wherein the distal end of the primary tow cable is attached to the first end of the sensor array, wherein the distal end of the secondary tow cable is attached to the second end of the sensor array, and wherein the proximal end of the secondary tow cable is attached to a subsequent watercraft.

4. The system of claim 2, wherein the watercrafts connected by the sensor array, the primary tow cable, and the secondary tow cable form an open chain, a closed loop, or a reticulum.

5. The system of claim 1, wherein the control station is a computer system comprising:
   a) a processor;
   b) a memory;
   c) a cloud computer system; and
   d) an operating system.

6. The system of claim 1, wherein the watercrafts comprise a master watercraft and one or more slave watercrafts, wherein the control system communicates with the master watercraft, which commands one or more slave watercrafts.

7. The system of claim 1, wherein the watercrafts comprise a ship, a boat, an aerial drone, a hovercraft, a submarine, or any combination thereof.

8. The system of claim 1, wherein the quantity of watercrafts is about 2 to about 10,000.

9. The system of claim 1, wherein at least one watercraft contains a digital signal processor, and wherein the digital signal processor contains a system for tampering prevention.

10. The system of claim 1, wherein the length of the tow cable is at least about 50 feet.

11. The system of claim 1, wherein the diameter of the tow cable is about 0.5 millimeters to about 9 millimeters.

12. The system of claim 1, wherein the sensor array comprises:
    a) an acoustic sensor;
    b) an electromagnetic sensor; or
    c) a depth sensor.

13. The system of claim 1, wherein the length of the sensor array is about 6 feet to about 600 feet.

14. The system of claim 1, further comprising a buoyancy engine, wherein the buoyancy engine is attached to at least one of: the sensor array and one of the at least two tow cables.

15. The system of claim 14, wherein the quantity of buoyancy engines is about 2 to about 300.

16. The system of claim 1, wherein one or more of the watercrafts comprise a tow cable direction sensor.

17. The system of claim 1, configured to position the sensor array at a depth of about 1 foot to about 1,000 feet.

18. A method of localizing a submerged sensor array comprising:
    a) a user programming a target parameter into a control station;
    b) the control station calculating an operational instruction;
    c) the control station sending the operational instruction to a sensor array positioning system;
    d) the sensor array positioning system receiving the operational instruction;
    e) the sensor array positioning system storing the operational instruction;
    f) the sensor array positioning system measuring a current position, arrangement, and sensor array depth;
    g) the sensor array positioning system modifying the current position and arrangement without a pilot; and
    h) the sensor array positioning system modifying the sensor array depth;
    wherein a master watercraft is commanded by a control station, and wherein the master watercraft directs a slave watercraft.

19. The method of claim 18, wherein the target parameter comprises:
    a) a sensor array position;
    b) a sensor array velocity;
    c) a sensor array heading;
    d) a sensor array depth;
    e) a separation distance between two adjacent watercrafts;
    f) initiating sensor array measurement; or
    g) ceasing sensor array measurement.

20. The method of claim 18, wherein the operational instruction comprises:
    a) a watercraft position;
    b) a watercraft velocity;
    c) a watercraft heading; or
    d) a buoyancy engine buoyancy.

21. The method of claim 19, wherein a series of one or more target parameters is programmed automatically by selecting a mode from a plurality of modes comprising patterns of target parameters for:
- a) transit;
- b) obstacle avoidance;
- c) debris disentanglement;
- d) surveillance; and
- e) search.

22. The method of claim 18, wherein the step of the sensor array positioning system measuring a current position, arrangement, and sensor array depth further comprises:
- a) measuring a position of the master watercraft or the slave watercraft;
- b) measuring a heading of the master watercraft or the slave watercraft;
- c) measuring a tow cable direction; or
- d) any combination thereof.

23. The method of claim 18, wherein the step of the sensor array positioning system modifying the current position and arrangement comprises:
- a) modifying a position of the master watercraft or the slave watercraft;
- b) modifying a velocity of the master watercraft or the slave watercraft;
- c) modifying a heading of the master watercraft or the slave watercraft;
- d) modifying a buoyancy of one or more buoyancy engines; or
- e) any combination thereof.

24. The method of claim 18, further comprising the sensor array positioning system remeasuring its current position after a period of time.

* * * * *